(12) United States Patent
Shao

(10) Patent No.: US 10,531,481 B2
(45) Date of Patent: Jan. 7, 2020

(54) UPLINK CHANNEL TRANSMISSION METHOD, UE, AND BASE STATION

(71) Applicant: HUAWEI TECHNOLOGIES CO., LTD., Shenzhen (CN)

(72) Inventor: Jiafeng Shao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/899,287

(22) Filed: Feb. 19, 2018

(65) Prior Publication Data

US 2018/0176938 A1 Jun. 21, 2018

Related U.S. Application Data

(63) Continuation of application No. PCT/CN2015/088290, filed on Aug. 27, 2015.

(51) Int. Cl.
*H04W 72/12* (2009.01)
*H04W 52/34* (2009.01)
(Continued)

(52) U.S. Cl.
CPC ..... *H04W 72/1268* (2013.01); *H04W 52/146* (2013.01); *H04W 52/246* (2013.01);
(Continued)

(58) Field of Classification Search
CPC ......... H04W 72/1268; H04W 72/0446; H04W 72/0413; H04W 72/0493; H04W 52/146;
(Continued)

(56) References Cited

U.S. PATENT DOCUMENTS

2006/0034285 A1 2/2006 Pirskanen et al.
2015/0334729 A1* 11/2015 Ji ...................... H04W 72/0453
370/336
(Continued)

FOREIGN PATENT DOCUMENTS

CN 101977099 A 2/2011
CN 102740407 A 10/2012
(Continued)

OTHER PUBLICATIONS

"3rd Generation Partnership Project; Technical Specification Group Radio Access Network; Feasibility Study for Enhanced Uplink for UTRA FDD; (Release 6)," 3GPP TR 25.896, V1.3.2, pp. 1-177, 3rd Generation Partnership 'Project, Valbonne, France (Feb. 2004).
(Continued)

*Primary Examiner* — Habte Mered
(74) *Attorney, Agent, or Firm* — Leydig, Voit & Mayer, Ltd.

(57) ABSTRACT

The present disclosure provides an uplink channel transmission method, a user equipment (UE), and a base station in the communications field. The method includes: determining, by the UE, n first channels and m second channels; allocating transmit power to L uplink channels according to a maximum uplink transmission time difference between the n first channels and the m second channels, where the L uplink channels include at least k second channels among the m second channels; and transmitting the L uplink channels. The first channel is an uplink channel corresponding to a first cell on a first time unit numbered i, and the first time unit has a first transmission time interval (TTI). The second channel is an uplink channel corresponding to a second cell on a second time unit numbered j, and the second time unit has a second TTI. The second TTI is shorter than the first TTI.

18 Claims, 6 Drawing Sheets

(51) Int. Cl.
  *H04W 72/04*   (2009.01)
  *H04W 52/14*   (2009.01)
  *H04W 52/24*   (2009.01)
  *H04L 5/00*    (2006.01)
  *H04W 52/28*   (2009.01)
  *H04W 52/32*   (2009.01)
  *H04W 52/36*   (2009.01)

(52) U.S. Cl.
  CPC ......... *H04W 52/34* (2013.01); *H04W 52/346* (2013.01); *H04W 72/0413* (2013.01); *H04W 72/0493* (2013.01); *H04L 5/0007* (2013.01); *H04W 52/281* (2013.01); *H04W 52/325* (2013.01); *H04W 52/367* (2013.01); *H04W 72/0446* (2013.01)

(58) Field of Classification Search
  CPC . H04W 52/246; H04W 52/34; H04W 52/346; H04W 52/281; H04W 52/325; H04L 5/0007
  See application file for complete search history.

(56) References Cited

U.S. PATENT DOCUMENTS

| | | | |
|---|---|---|---|
| 2016/0044599 A1* | 2/2016 | Damnjanovic | H04W 52/04 455/522 |
| 2016/0128045 A1* | 5/2016 | Azarian Yazdi | H04L 5/0053 370/330 |
| 2016/0205631 A1* | 7/2016 | Chen | H04W 52/04 455/522 |
| 2016/0255594 A1* | 9/2016 | Vajapeyam | H04W 52/346 455/522 |
| 2017/0318582 A1 | 11/2017 | Au et al. | |
| 2018/0213489 A1* | 7/2018 | Andou | H04W 16/32 |
| 2018/0234998 A1* | 8/2018 | You | H04W 72/042 |

FOREIGN PATENT DOCUMENTS

| | | |
|---|---|---|
| CN | 104620629 A | 5/2015 |
| WO | 2015096821 A1 | 7/2015 |
| WO | 2016137816 A2 | 9/2016 |

OTHER PUBLICATIONS

CN/201580071567.0, Office Action dated Jul. 24, 2019.

* cited by examiner

UPLINK CHANNEL TRANSMISSION METHOD, UE, AND BASE STATION

CROSS-REFERENCE TO RELATED APPLICATIONS

This application is a continuation of International Application No. PCT/CN2015/088290, filed on Aug. 27, 2015, the disclosure of which is hereby incorporated by reference in its entirety.

TECHNICAL FIELD

The present disclosure relates to the communications field, and in particular, to an uplink channel transmission method, a User Equipment (UE), and a base station.

BACKGROUND

In an Long Term Evolution (LTE) system, a process of transmitting an uplink channel by a UE includes: the UE receives downlink scheduling signaling transmitted by a base station, demodulates the downlink scheduling signaling, prepares uplink data, allocates transmit power to an uplink channel according to obtained uplink channel information such as required power, or maximum transmit power allowed by the UE, and then transmits the uplink channel.

A subframe length may be 1 ms, and a Transmission Time Interval (TTI) length may be 1 ms. The scheduling may be performed by using a TTI as a minimum scheduling unit. To implement a shorter data transmission delay, a shorter TTI has been proposed. For example, the TTI length may be set to 0.5 ms or set to be shorter.

The UE may only support transmission of an uplink channel corresponding to a 1 ms TTI. After a short TTI (for example, a 0.5 ms TTI or a shorter TTI) is implemented, if the UE supports both a long TTI (for example, the 1 ms TTI) and the short TTI, it can be ensured that only an uplink channel corresponding to the long TTI is transmitted, and it may not be ensured that an uplink channel corresponding to the short TTI can also be transmitted. Therefore, it is needed to provide a solution in which the UE can transmit the uplink channel corresponding to the short TTI when supporting both the long TTI and the short TTI.

SUMMARY

The present disclosure provides an uplink channel transmission method, a user equipment (UE), and a base station.

According to a first aspect of the present disclosure, an uplink channel transmission method is provided. The method may include: determining, by a user equipment (UE), to transmit information by using first channels on n first time units numbered i, and transmit information by using second channels on m second time units numbered j, wherein the first time unit numbered i is a first transmission time interval (TTI), the second time unit numbered j is a second TTI, the second TTI is shorter than the first TTI, at least one first time unit numbered i and at least one second time unit numbered j overlap, and the information transmitted by using the first channel and the information transmitted by using the second channel correspond to different cells.

The method may also include determining, by the UE, a maximum uplink transmission time difference between the n first time units numbered i and the m second time units numbered j, wherein the maximum uplink transmission time difference is a maximum difference between n start transmission time points of the n first time units numbered i and m start transmission time points of the m second time units numbered j; allocating, by the UE, transmit power to L uplink channels according to the maximum uplink transmission time difference, where the L uplink channels include at least k second channels among the m second channels, where k is a positive integer and $1 \leq k \leq m$; and transmitting, by the UE, the L uplink channels.

According to a second aspect of the present disclosure, a user equipment (UE) is provided. The UE may include a determining circuit that may be configured to determine a first time unit on a first channel and a second time unit on a second channel, where the first time unit has n first time units, the first channel has n first channels, each of the n first time units is numbered i, the second time unit has m second time units, the second channel has m second channels, and each of the m second time units is numbered j, where n, i, m, j are positive integers, and where the first time unit has a first transmission time interval (TTI), the second time unit has a second TTI, the second TTI is shorter than the first TTI, at least one first time unit and at least one second time unit overlap, and the information transmitted by using the first channel and the information transmitted by using the second channel correspond to different cells, and the determining circuit may also be configured to determine a maximum uplink transmission time difference, where the maximum uplink transmission time difference is a maximum difference between n start transmission time points of the n first time units and m start transmission time points of the m second time units.

According to a third aspect of the present disclosure, a base station is provided. The base station may include a transmission circuit that may be configured to: transmit reserved power information of a first transmission time interval (TTI) and reserved power information of a second TTI to a user equipment (UE), so that the UE allocates transmit power to L uplink channels according to the reserved power information of the first TTI and the reserved power information of the second TTI when a first time unit and a second time unit overlap where the first time unit is numbered i and the second time unit is numbered j and i and j are positive integers; or transmit the reserved power information of the second TTI to the UE, so that the UE allocates the transmit power to a L uplink channels according to the reserved power information of the second TTI when the first time unit and the second time unit overlap.

The base station may also include a receiving circuit that may be configured to receive the L uplink channels transmitted by the UE, where the L uplink channels include at least k second channels among m second channels, where m and k are positive integers and $1 \leq k \leq m$, the second channel is an uplink channel on the second time unit, the first time unit has the first TTI, the second time unit has the second TTI, and the second TTI is shorter than the first TTI.

The UE may also include a power allocation circuit that may be configured to allocate transmit power to L uplink channels according to the maximum uplink transmission time difference, where the L uplink channels include at least k second channels among the m second channels, and where k is a positive integer and $1 \leq k \leq m$; and a transmission circuit that may be configured to transmit the L uplink channels.

It is to be understood that both the foregoing general description and the following detailed description are exemplary only and are not restrictive of the present disclosure.

BRIEF DESCRIPTION OF DRAWINGS

To describe the technical solutions in the examples of the present disclosure more clearly, the following briefly describes the accompanying drawings required for describing the examples. Apparently, the accompanying drawings in the following description show merely some examples of the present disclosure, and a person of ordinary skill in the art may still derive other drawings from these accompanying drawings without creative efforts.

DETAILED DESCRIPTION

The following clearly describes the technical solutions in the examples of the present disclosure with reference to the accompanying drawings in the examples of the present disclosure. Apparently, the described examples are merely some but not all of the examples of the present disclosure. All other examples obtained by a person of ordinary skill in the art based on the examples of the present disclosure without creative efforts shall fall within the protection scope of the present disclosure.

In downlink transmission of an LTE system, the first three symbols of a TTI are referred to as a control area for mainly transmitting a control channel such as a Physical Downlink Control Channel (PDCCH), and the PDCCH is used to schedule a Physical downlink Shared Channel (PDSCH), or a Physical Uplink Shared Channel (PUSCH). Remaining symbols of the TTI are referred to as a data area for mainly transmitting the PDSCH or an Enhanced Physical downlink Control Channel (EPDCCH).

Uplink transmission of the LTE system generally includes a Physical Uplink Control Channel (PUCCH), a Physical Random Access Channel (PRACH), an Sounding Reference Signal (SRS), and the physical uplink shared channel PUSCH. Uplink Control Information (UCI) is usually carried on the PUCCH and the PUSCH. The UCI specifically includes: an Hybrid Automatic Repeat request-Acknowledgement (HARQ-ACK), an Scheduling Request (SR), and Channel State Information (CSI).

In a current LTE system, a subframe length is 1 ms, and a TTI length is also set to 1 ms. All scheduling is performed by using a TTI as a minimum scheduling unit. A round trip time (RTT) from initial transmission to retransmission is usually 8 ms. To implement a shorter RTT and a shorter data transmission delay, it has been proposed that a TTI length is set to 0.5 ms or set to be shorter.

Figure 1:
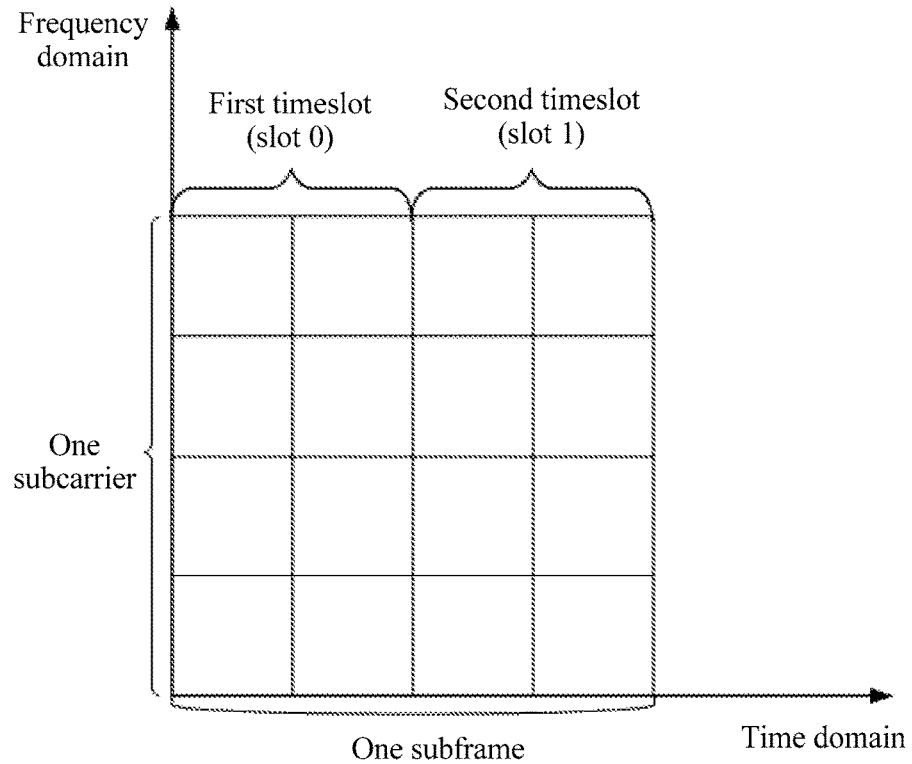
FIG. 1 is a schematic diagram of a TTI type according to an example of the present disclosure.

Therefore, UE may transmit a short-delay service (for example, a small packet or a voice) by using a 0.5 ms TTI on a cell (cell), and transmit a service with a large data volume (for example, an online video, or large file downloading) by using a 1 ms TTI on the cell or another cell. As shown in FIG. 1, the 0.5 ms TTI may be in a slot 0 (the first timeslot in a subframe) or a slot 1 (the second timeslot in the subframe). A time unit in which the slot 0 is located is the first timeslot of the subframe, and a time unit in which the slot 1 is located is the second timeslot of the subframe. In a 1 ms TTI LTE system, a processing time of 1 ms TTI UE from receiving a PDCCH by the UE to transmitting an uplink channel by the UE is approximately 4 ms. By analogy, in a 0.5 ms TTI LTE system, a processing time reserved for 0.5 ms TTI UE is approximately 2 ms. For a (0.5 ms+1 ms) hybrid scenario (for example, a scenario in which the UE includes a first apparatus supporting a 1 ms TTI and a second apparatus supporting a 0.5 ms TTI), there are two processing cases. Referring to FIG. 1, a processing time of the UE is described in the following two scenarios.

Figure 2:
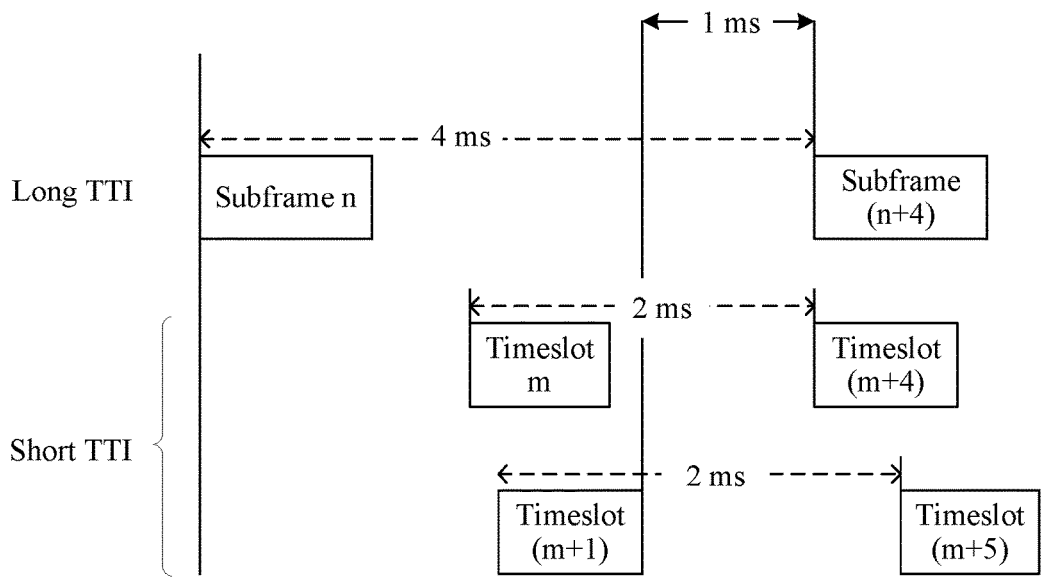
FIG. 2 is a schematic diagram of transmitting uplink channels of both a long TTI and a short TTI according to an example of the present disclosure.

1. A scenario in which the UE needs to transmit both an uplink channel corresponding to a 0.5 ms TTI of a timeslot numbered (m+4) and an uplink channel corresponding to a 1 ms TTI of a subframe numbered (n+4). Because a base station separately schedules TTIs with different lengths, moments at which the first apparatus and the second apparatus receive downlink scheduling signaling transmitted by the base station are different. For example, as shown in FIG. 2, if the first apparatus transmits an uplink channel on the subframe numbered (n+4), the second apparatus transmits an uplink channel on the timeslot numbered (m+4), and the timeslot numbered (m+4) is the first timeslot in the subframe numbered (n+4) herein. For the first apparatus supporting a 1 ms TTI, a processing time of the first apparatus from a moment of receiving, on a subframe numbered n, the downlink scheduling signaling transmitted by the base station to a moment of transmitting an uplink channel on an uplink subframe numbered (n+4) is approximately 4 ms. For the second apparatus supporting a 0.5 ms TTI, a processing time of the second apparatus from a moment of receiving, on a timeslot numbered m, the downlink scheduling signaling transmitted by the base station to a moment of transmitting an uplink channel on an uplink timeslot numbered (m+4) is approximately 2 ms. Therefore, before the subframe numbered (n+4) and the timeslot numbered (m+4) start, the UE needs to allocate transmit power to both the uplink channel corresponding to the 0.5 ms TTI of the timeslot numbered (m+4) and the uplink channel corresponding to the 1 ms TTI of the subframe numbered (n+4), a processing time of the UE is still 2 ms, and a 2 ms processing capability is the same as that of 0.5 ms TTI UE.

2. A scenario in which the UE needs to transmit both an uplink channel corresponding to a 0.5 ms TTI of a timeslot numbered (m+5) and an uplink channel corresponding to a 1 ms TTI of a subframe numbered (n+4). For example, as shown in FIG. 2, if the first apparatus transmits an uplink channel on the subframe numbered (n+4), the second apparatus transmits an uplink channel on the timeslot numbered (m+5) (corresponding to the second timeslot in the subframe numbered (n+4)). For the first apparatus supporting a 1 ms TTI, a processing time of the first apparatus from a moment of receiving, on a subframe numbered n, the downlink scheduling signaling transmitted by the base station to a moment of transmitting an uplink channel on an uplink subframe numbered (n+4) is approximately 4 ms. For the second apparatus supporting a 0.5 ms TTI, a processing time of the second apparatus from a moment of receiving, on a timeslot numbered (m+1), the downlink scheduling signaling transmitted by the base station to a moment of transmitting an uplink channel on an uplink subframe numbered (m+5) is 2 ms. If the UE needs to allocate transmit power to the uplink channel corresponding to the 1 ms TTI on the subframe numbered (n+4), the UE also allocates transmit power to the uplink channel corresponding to the 0.5 ms TTI. In this way, the processing time of the UE needs to be further reduced to 1.5 ms approximately. If the processing time of the UE is shortened, it means that a requirement for a chip processing speed of the UE is further increased, increasing implementation costs of the UE. For UE with a 2 ms processing capability that cannot meet a 1.5 ms processing capability, before the subframe numbered (n+4) starts, when the UE allocates transmit power to the uplink channel corresponding to the 1 ms TTI of the subframe numbered (n+4), because data on the uplink channel corresponding to the 0.5 ms TTI of the timeslot numbered (m+5) cannot be fully prepared, the transmit power cannot be allocated to the uplink channel corresponding to the 0.5 ms TTI. Therefore, the UE allocates all the power to the uplink channel corresponding to the 1 ms TTI. Consequently, no transmit power may be allocated to the uplink channel corresponding to the 0.5 ms TTI.

Therefore, a method needs to be provided, so that the UE can allocate, in the foregoing two scenarios, transmit power to an important uplink channel or a delay-sensitive uplink channel in uplink channels corresponding to the 0.5 ms TTI (or a short TTI less than 0.5 ms), so as to ensure normal communication for a service on the uplink channel.

Figure 3:
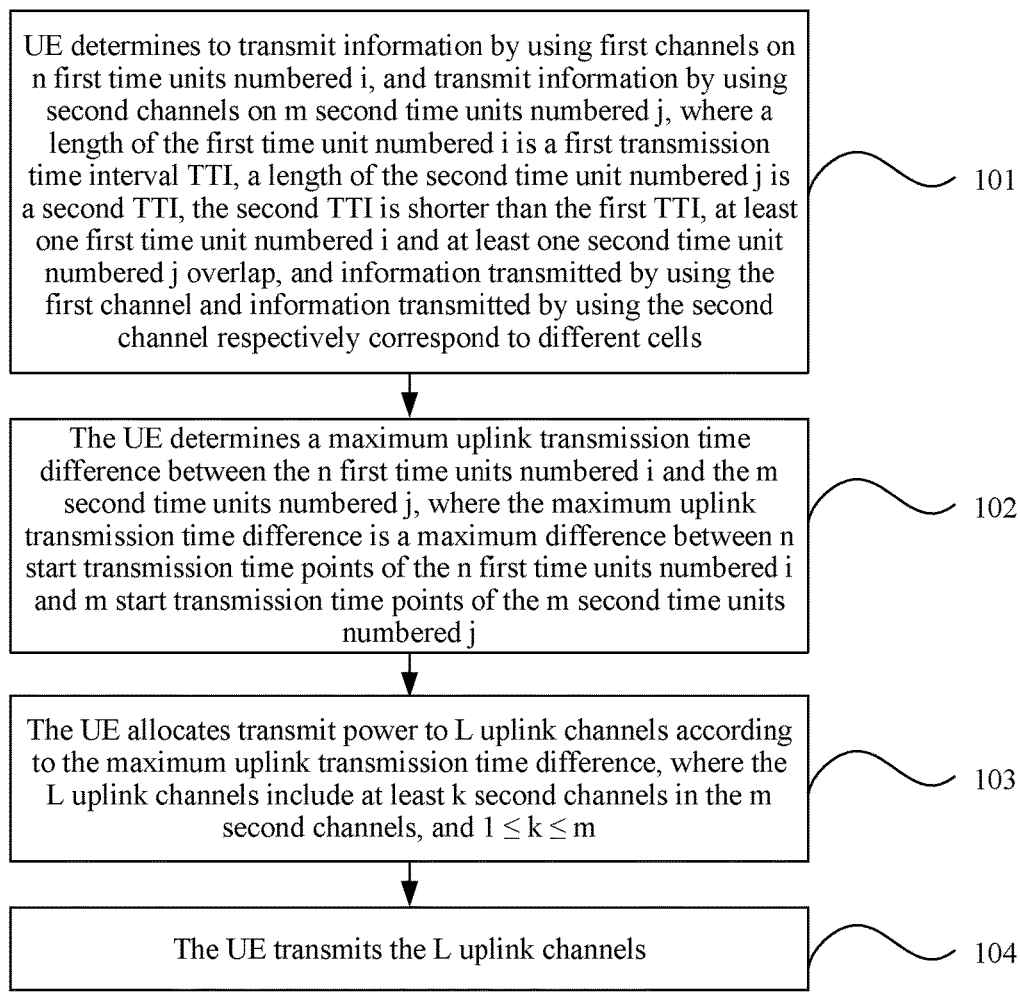
FIG. 3 is a schematic flowchart of an uplink channel transmission method according to an example of the present disclosure.

This example of the present disclosure provides an uplink channel transmission method, which is executed by UE. As shown in FIG. 3, the method includes the following steps.

101. The UE determines to transmit information by using first channels on n first time units numbered i, and transmit information by using second channels on m second time units numbered j, where a length of the first time unit numbered i is a first transmission time interval TTI, a length of the second time unit numbered j is a second TTI, the second TTI is shorter than the first TTI, at least one first time unit numbered i and at least one second time unit numbered j overlap, and information transmitted by using the first channel and information transmitted by using the second channel respectively correspond to different cells.

It should be noted that the first channels on n first time units numbered i may be understood that each first time unit numbered i includes one first channel, that is, it is equivalent to that n first channels exist. The second channels on the m second time units numbered j may be understood that each second time unit numbered j includes one second channel, that is, it is equivalent to that m second channels exist.

The first time unit may be a subframe having a length of 1 ms, a timeslot having a length of 0.5 ms, one or more SC-FDMA symbols, or one or more OFDMA symbols. The second time unit may be a timeslot having a length of 0.5 ms, one or more SC-FDMA symbols, one or more OFDMA symbols, or a time unit shorter than an SC-FDMA symbol or an OFDMA symbol. The first cell and a second cell may correspond to one or more base stations. For example, the first TTI may be 1 ms, and the second TTI may be 0.5 ms. The first TTI may be 0.5 ms, and the second TTI may be one SC-FDMA symbol.

102. The UE determines a maximum uplink transmission time difference between the n first time units numbered i and the m second time units numbered j, where the maximum uplink transmission time difference is a maximum difference between n start transmission time points of the n first time units numbered i and m start transmission time points of the m second time units numbered j.

Specifically, that the UE determines a maximum uplink transmission time difference includes the following steps:

1. The UE obtains a modulus value after performing subtraction between a start transmission time point (uplink start transmission time) of the first time unit numbered i in which each of the n first channels is located and a start transmission time point of the second time unit numbered j in which a second channel a in the m second channels is located, to obtain n differences.

2. Perform the foregoing step 1 for (m−1) second channels in the m second channels other than the second channel a, to obtain (n×(m−1)) differences.

Referring to step 1, the UE obtains (n×(m−1)+n=n×m) differences.

3. Use a maximum value in the (n×m) differences as the maximum uplink transmission time difference.

It should be noted that a start transmission time point may be a start transmission moment of the first time unit or the second time unit, or a start transmission moment of the first channel or the second channel.

103. The UE allocates transmit power to L uplink channels according to the maximum uplink transmission time difference, where the L uplink channels include at least k second channels in the m second channels, and 1≤k≤m.

In this way, when the UE can support both a long TTI and a short TTI, the UE needs to allocate transmit power to an uplink channel corresponding to the short TTI, so that the uplink channel corresponding to the short TTI can be transmitted, and a service carried on the uplink channel corresponding to the short TTI is properly received by a base station. In addition, when k is less than L, that is, when the UE may further allocate transmit power to the first channel (an uplink channel corresponding to the long TTI), the UE may transmit both the uplink channel corresponding to the long TTI (the first TTI in the present disclosure) and the uplink channel corresponding to the short TTI (the second TTI in the present disclosure), so as to ensure that services carried on the channels are received by the base station.

Certainly, the L uplink channels are selected by the UE from (m+n) channels (the n first channels and the m second channels) according to a channel priority. The k second channels corresponding to the short TTI may be channels carrying an important service or channels carrying a delay-sensitive service. Therefore, when the L uplink channels include the k second channels, it can be ensured that a service carried on a channel carrying an important service or a delay-sensitive channel in the uplink channels is properly received by the base station.

104. The UE transmits the L uplink channels.

The transmit power is allocated to the L uplink channels in step 103, so that it can be ensured that the L uplink channels are transmitted. If the second channel exists, the k second channels are necessarily included, so as to avoid a case in which service communication between the UE and the base station is affected because data carried on the second channel cannot be transmitted.

In a specific example of the present disclosure, the allocating, by the UE, transmit power to L uplink channels according to the maximum uplink transmission time difference specifically includes the following three cases:

In a first case, when the maximum uplink transmission time difference is greater than or equal to a first preset value, and a start transmission time point of the first time unit numbered i is earlier than a start transmission time point of the second time unit numbered j, the UE allocates a first power value to the k second channels in the m second channels according to a first channel priority. The first power value is less than maximum transmit power of the UE.

When the maximum uplink transmission time difference is greater than or equal to a first preset value, and the first time unit numbered i is earlier than the second time unit numbered j, the UE reserves a first power value, to allocate transmit power to the k second channels in the m second channels, so as to prevent all the transmit power from being used to transmit the n first channels.

For example, in a (slot 1+1 ms) scenario shown in FIG. 1. When a maximum uplink transmission time difference between start transmission time points of n subframes numbered (n+4) and start transmission time points of m timeslots numbered (m+5) is greater than or equal to the first preset value, the UE reserves the first power value for the k second channels in the m second channels. Therefore, the k second channels in the m second channels may also be transmitted. Here, a subframe may be understood as the first time unit, and a timeslot may be understood as the second time unit.

It should be noted that, that the first time unit numbered i is earlier than the second time unit numbered j can be understood that all the start transmission time points of the n first time units are earlier than all the start transmission time points of the m second time units, or a start transmission time point of a primary first time unit in the n first time units is earlier than a start transmission time point of a primary second time unit in the m second time unit. The primary first time unit may be a first time unit carrying important information in all the first time units, a first time unit carrying a PUCCH, a first time unit carrying a PRACH, or a first time unit configured by the base station to be corresponding to an important cell. The primary second time unit may be a second time unit carrying important information in all the second time units, a second time unit carrying a PUCCH, a second time unit carrying a PRACH, or a second time unit configured by the base station to be corresponding to an important cell.

Because the UE selects the k second channels from the m second channels according to the first channel priority, the k second channels are the first k channels in the m second channels sorted in descending order according to the first channel priority. For example, if the first power value is 10 dBm, one PRACH with a highest priority requires transmit power of 6 dBm, and one channel with a relatively low priority carrying an SR requires transmit power of 4 dBm, the UE allocates the first power value to one PRACH and one second channel carrying an SR. In this case, k=2.

Priority levels in descending order according to the first channel priority are as follows:

a physical random access channel PRACH, a channel carrying a hybrid automatic repeat request-acknowledgment HARQ-ACK or a scheduling request SR, a channel carrying channel state information CSI, a channel carrying only data, and a sounding reference signal SRS.

Alternatively, priority levels in descending order according to the first channel priority are as follows: a PRACH, a physical uplink control channel PUCCH, a physical uplink shared channel PUSCH, and an SRS.

Alternatively, transmission time points in descending order according to the first channel priority are as follows:

a channel A that is transmitted first, and a channel B that is transmitted after the channel A.

Further, the UE allocates remaining power to at least one of the n first channels according to the first channel priority. The remaining power is a difference between the maximum transmit power of the UE and the first power value.

In this case, the L uplink channels further include at least one first channel selected from the n first channels.

It should be noted that because the UE performs allocation according to the first channel priority, the UE may allocate the remaining power to all first channels, or allocate the remaining power to some first channels. This is not limited herein. For example, if the remaining power is 5 dBm, a priority of a first channel A is highest, a priority of a first channel B is second highest, the first channel A requires power of 3 dBm, and the second channel B requires power of 2 dBm, the remaining power is allocated to two first channels, and the L uplink channels further include the two first channels, that is, the first channel A and the first channel B.

In a second case, when the maximum uplink transmission time difference is greater than or equal to a first preset value, and a start transmission time point of the first time unit numbered i is earlier than a start transmission time point of the second time unit numbered j, the UE allocates a first power value to the k second channels in the m second channels according to a first channel priority, and allocates a second power value to z first channels in the n first channels according to the first channel priority. A sum of the first power value and the second power value is less than maximum transmit power of the UE.

In this case, the L uplink channels further include the z first channels in the n first channels, where $1 \leq z \leq n$.

The UE allocates the first power value to the k second channels in the m second channels, and allocates the second power value to the z first channels in the n first channels.

It should be noted that, that the first time unit numbered i is earlier than the second time unit numbered j can be understood that all the start transmission time points of the n first time units are earlier than all the start transmission time points of the m second time units, or a start transmission time point of a primary first time unit in the n first time units is earlier than a start transmission time point of a primary second time unit in the m second time units. Definitions of the primary first time unit and the primary second time unit are the same as the foregoing definitions, and details are not described again.

It should be noted that because the UE selects the k second channels from the m second channels according to the first channel priority, the k second channels are the first k channels in the m second channels sorted in descending order according to the first channel priority. Likewise, the z first channels are the first z channels in the n first channels sorted in descending order according to the first channel priority. For example, if the first power value is 10 dBm, one PRACH with a highest priority requires transmit power of 6 dBm, and one second channel with a relatively low priority carrying an SR requires transmit power of 4 dBm, the UE allocates the first power value to one PRACH and one second channel carrying an SR. In this case, k=2. If the second power value is 8 dBm, one PRACH with a highest priority requires transmit power of 6 dBm, one first channel with a relatively low priority carrying an SR requires transmit power of 4 dBm, and a first channel carrying channel state information CSI requires transmit power of 4 dBm, the second power value is first allocated to the PRACH, and then is allocated to the first channel carrying an SR. Because remaining power of 2 dBm in the second power value does not meet the transmit power required by the first channel carrying an SR, the first channel carrying an SR can be transmitted only by using 2 dBm, and finally, no remaining power is allocated to the first channel carrying CSI. Consequently, the first channel carrying CSI cannot be transmitted. Therefore, the UE allocates the second power value to one PRACH and one first channel carrying an SR. In this case, z=2.

Further, the UE allocates remaining power to at least one of (m−k) second channels in the m second channels other than the k second channels according to the first channel priority. The remaining power is a difference between the maximum transmit power of the UE and the sum of the first power value and the second power value.

In this case, the L uplink channels further include at least one second channel selected from the (m−k) second channels in the m second channels other than the k second channels.

In a third case, when the maximum uplink transmission time difference is less than or equal to a second preset value, the UE allocates maximum transmit power of the UE to the k second channels in the m second channels according to a second channel priority; or when the maximum uplink transmission time difference is greater than or equal to a third preset value, and a start transmission time point of the second time unit numbered j is earlier than a start transmission time point of the first time unit numbered i, the UE allocates maximum transmit power of the UE to the k second channels in the m second channels according to a second channel priority.

Priority levels in descending order according to the second channel priority are as follows: the second channel and the first channel. Power is allocated to the first channel according to a first channel priority, and power is allocated to the second channel according to the first channel priority. It should be noted that power is first allocated to the second channel. If the UE has remaining transmit power, power is then allocated to the first channel. When power is allocated to the second channel, a first channel priority criterion is used, that is, power is allocated to the second channel in descending order according to the first channel priority, until the transmit power of the UE is fully allocated or the transmit power is allocated to all second channels. When the UE still has transmit power after power is allocated to all the m second channels, the UE allocates remaining transmit power to the z first channels in the n first channels according to the first channel priority.

It should be noted that when the maximum uplink transmission time difference is less than or equal to the second preset value, because the second preset value may be a quite small value such as 35.21 μs or 55.21 μs, it may be considered that a difference between start transmission time points of the n first time units and start transmission time points of the m second time units is quite small. Therefore, the UE can allocate power to both the n first channels and the m second channels without a need of reducing too much processing time. In the present disclosure, a second channel corresponding to the short TTI is considered to be more important. Therefore, the UE first allocates the transmit power to the k second channels in the m second channels. For example, in a (slot 0+1 ms) scenario shown in FIG. 1, a maximum uplink transmission time difference between start transmission time points of n subframes numbered (n+4) and start transmission time points of the m second channels of m timeslots numbered (m+4) is less than or equal to the second preset value. When the maximum uplink transmission time difference is greater than or equal to a third preset value, and the second time unit numbered j is earlier than the first time unit numbered i, the start transmission time points of the m second time units are earlier than the start transmission time points of the n first time units. Although a transmission time difference between a channel on the first time unit and a channel on the second time unit is excessively large, the second time unit corresponding to the short TTI is earlier than the first time unit corresponding to the long TTI. For UE that can support a short TTI, it may be considered herein that a processing time of the UE is sufficient, and it is considered that the second channel corresponding to the short TTI is more important in the present disclosure. Therefore, power is first allocated to the second channel.

It should be noted that the first power value specifically includes: a transmit power value used when the UE transmits an uplink channel corresponding to a second cell on a second time unit numbered (j−1); or a transmit power value used when the UE transmits a channel of a second cell last time; or a power value reserved by the UE for an uplink channel corresponding to the second TTI according to a predefined parameter. For example, the predefined parameter may be a transmit power ratio r1. The UE determines, according to the predefined parameter, that the reserved power value is a product of r1 and a maximum transmit power value currently allowed by the UE. For example, the predefined parameter may be a power value. The UE determines that the reserved power value is a fixed power value. Alternatively, the UE reserves the power value for the uplink channel corresponding to the second TTI according to received reserved power information of the second TTI. For example, the reserved power information may be a transmit power ratio r2 configured by the base station. The UE determines, according to the reserved power information, that the reserved power value is a product of r2 and a maximum transmit power value currently allowed by the UE. For example, the reserved power information may be a power value configured by the base station. The UE determines that the reserved power value is the power value configured by the base station.

In addition, the second time unit numbered (j−1) is adjacent to the second time unit numbered j, and a start transmission time point of the second time unit numbered (j−1) is earlier than the start transmission time point of the second time unit numbered j. The first power value is the transmit power value used when the UE transmits the channel of the second cell last time, that is, the first power value used to transmit the channel of the second cell for an $n^{th}$ time is the same as the transmit power value used to transmit the channel of the second cell for an $(n-1)^{th}$ time.

The second power value specifically includes: a transmit power value used when the UE transmits an uplink channel corresponding to a first cell on a first time unit numbered (i−1); or a transmit power value used when the UE transmits a channel of a first cell last time; or a power value reserved by the UE for an uplink channel corresponding to the first TTI according to a predefined parameter; or a power value reserved by the UE for an uplink channel corresponding to the first TTI according to received reserved power information of the first TTI. For example, the predefined parameter/reserved power information may be a maximum transmit power percentage of the UE, or an absolute power value.

In a preferred example of the present disclosure, before the user equipment UE determines the n first channels and the m second channels, the method further includes:

reporting, by the UE, capability information to the base station, where the capability information is used to indicate that the UE can support transmitting and/or receiving both a channel corresponding to a long TTI and a channel corresponding to a short TTI; or receiving, by the UE, capability indication information transmitted by the base station, where the capability indication information is used to indicate that the UE transmits and/or receives both a channel corresponding to a long TTI and a channel corresponding to a short TTI.

It should be noted that the UE first allocates power to a channel with a highest priority, then allocates power to a remaining channel with a high priority, and finally considers allocating power to a channel with a low priority. Each carrier has its own uplink transmit power upper limit. Even though channel transmit power of each carrier does not exceed a power upper limit of each carrier, total transmit power of a plurality of channels may still exceed configured maximum transmit power of the UE. In this case, the UE may first allocate power to the channel with a high priority, and then consider allocating power to the channel with a low priority. If power is insufficient for the UE to allocate to the channel with a high priority, there is no transmit power for the channel with a low priority. However, when channel priorities are the same or channel power allocation priorities are not distinguished, if transmit power required by the plurality of channels exceeds maximum transmit power of the UE, power scaling, that is, power compression is performed.

In a preferred example of the present disclosure, when it is determined that the at least one first time unit numbered i and the at least one second time unit numbered j overlap in step 101, a first channel on the at least one first time unit numbered i and a second channel on the at least one second time unit numbered j further need to overlap, so that steps 102 to 104 can be performed in this example of the present disclosure.

In a preferred example of the present disclosure, the first preset value, the second preset value, and the third preset value are parameters pre-stored by the UE; or the first preset value, the second preset value, and the third preset value are determined by the UE according to received power control indication information.

The present disclosure provides the uplink channel transmission method. The UE determines the n first channels (uplink channels corresponding to the long TTI) and the m second channels (uplink channels corresponding to the short TTI), and allocates the transmit power to the L uplink channels according to the maximum uplink transmission time difference between the n first channels and the m second channels. The L uplink channels include at least the k second channels in the m second channels, and the first TTI corresponding to the first channel is shorter than the second TTI corresponding to the second channel. The UE transmits the L uplink channels. Because a scenario in which the UE supports both the long TTI and the short TTI does not occur currently, it can be ensured that the UE allocates the transmit power to only the uplink channel corresponding to the long TTI. Once the UE supports both the long TTI and the short TTI, when transmitting an uplink channel, the UE learns information about the uplink channel corresponding to the long TTI, and does not learn information about the uplink channel corresponding to the short TTI. The UE allocates all the transmit power to the uplink channel corresponding to the long TTI. Consequently, no power is allocated to the uplink channel corresponding to the short TTI, and the uplink channel corresponding to the short TTI cannot be transmitted. According to the method provided in the present disclosure, it can be ensured that the transmit power is allocated to the uplink channel corresponding to the short TTI. Therefore, it is ensured that the uplink channel corresponding to the short TTI can be transmitted, so that a service carried on the uplink channel corresponding to the short TTI is properly received by the base station.

Figure 4:
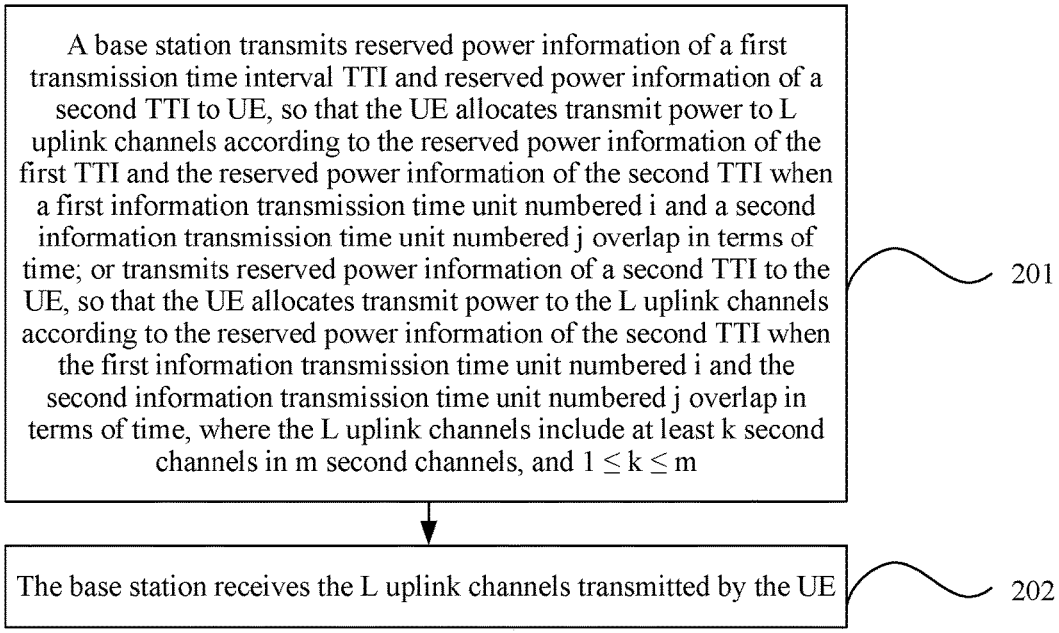
FIG. 4 is a schematic flowchart of an uplink channel transmission method according to another example of the present disclosure.

This example of the present disclosure provides an uplink channel transmission method, which is executed by a base station. As shown in FIG. 4, the method includes the following steps.

201. The base station transmits reserved power information of a first transmission time interval TTI and reserved power information of a second TTI to UE, so that the UE allocates transmit power to L uplink channels according to the reserved power information of the first TTI and the reserved power information of the second TTI when a first time unit numbered i and a second time unit numbered j overlap in terms of time; or transmits reserved power information of a second TTI to UE, so that the UE allocates transmit power to a L uplink channels according to the reserved power information of the second TTI when a first time unit numbered i and a second time unit numbered j overlap in terms of time, where the L uplink channels include at least k second channels in m second channels, and 1≤k≤m.

In specific implementation, the L uplink channels may further include remaining (m−k) second channels in the m second channels and n first channels. Alternatively, the L uplink channels may further include remaining (m−k) second channels in the m second channels and z first channels in n first channels. The first channel is an uplink channel corresponding to a first cell on the first time unit numbered i.

The first channel is the uplink channel corresponding to the first cell on the first time unit numbered i, and duration of the first time unit is the first transmission time interval TTI. The second channel is an uplink channel corresponding to a second cell on the second time unit numbered j, and duration of the second time unit is the second TTI. Duration of the second TTI is shorter than duration of the first TTI.

It should be noted that first channels on n first time units numbered i may be understood that each first time unit numbered i includes one first channel, that is, it is equivalent to that n first channels exist. Second channels on m second time units numbered j may be understood that each second time unit numbered j includes one second channel, that is, it is equivalent to that m second channels exist.

202. The base station receives the L uplink channels transmitted by the UE.

It should be noted that the first time unit may be a subframe having a length of 1 ms, a timeslot having a length of 0.5 ms, one or more SC-FDMA symbols, or one or more OFDMA symbols; and the second time unit may be a timeslot having a length of 0.5 ms, one or more SC-FDMA symbols, one or more OFDMA symbols, or a time unit shorter than an SC-FDMA symbol or an OFDMA symbol. The first cell and the second cell may correspond to one or more base stations. For example, the first TTI may be 1 ms, and the second TTI may be 0.5 ms. For example, the first TTI may be 0.5 ms, and the second TTI may be one SC-FDMA symbol.

In a preferred example of the present disclosure, the method further includes: transmitting, by the base station, capability indication information to the UE, where the capability indication information is used to indicate that the UE transmits and/or receives both a channel corresponding to a long TTI and a channel corresponding to a short TTI; or receiving capability information reported by the UE, where the capability information is used to indicate that the UE supports transmitting and/or receiving both a channel corresponding to a long TTI and a channel corresponding to a short TTI.

In a preferred example of the present disclosure, the base station transmits power control indication information to the UE, where the power control indication information is used to indicate that the UE determines a first preset value, a second preset value, and a third preset value.

The present disclosure provides the uplink channel transmission method. The UE determines the n first channels (uplink channels corresponding to the long TTI) and the m second channels (uplink channels corresponding to the short TTI), and allocates the transmit power to the L uplink channels according to the maximum uplink transmission time difference between the n first channels and the m second channels. The L uplink channels include at least the k second channels in the m second channels, and the first TTI corresponding to the first channel is shorter than the second TTI corresponding to the second channel. The UE transmits the L uplink channels. Because a scenario in which the UE supports both the long TTI and the short TTI does not occur currently, it can be ensured that the UE allocates the transmit power to only an uplink channel corresponding to the long TTI. Once the UE supports both the long TTI and the short TTI, when transmitting an uplink channel, the UE learns information about the uplink channel corresponding to the long TTI, and does not learn information about an uplink channel corresponding to the short TTI. The UE allocates all the transmit power to the uplink channel corresponding to the long TTI. Consequently, no power is allocated to the uplink channel corresponding to the short TTI, and the uplink channel corresponding to the short TTI cannot be transmitted. According to the method provided in the present disclosure, it can be ensured that the transmit power is allocated to the uplink channel corresponding to the short TTI. Therefore, it is further ensured that the uplink channel corresponding to the short TTI can be transmitted, so that a service carried on the uplink channel corresponding to the short TTI is properly received by the base station.

Figure 5:
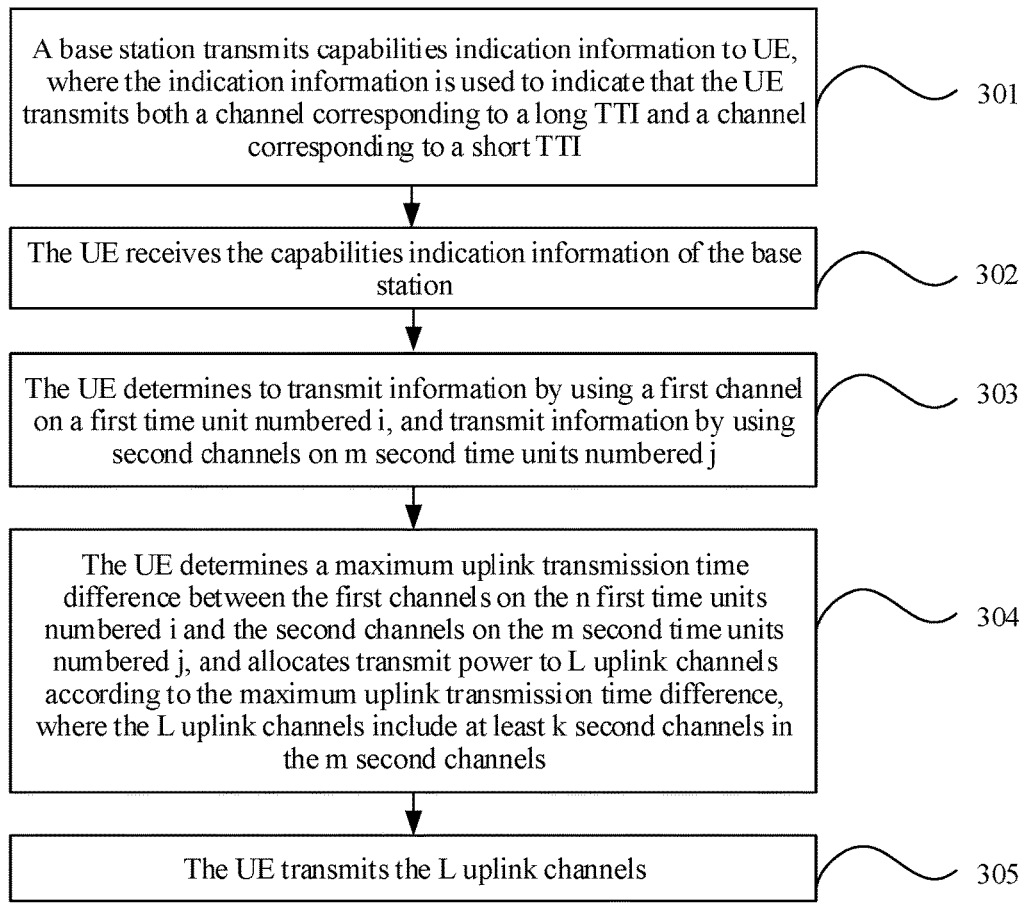
FIG. 5 is a schematic flowchart of an uplink channel transmission method according to a further example of the present disclosure.

This example of the present disclosure provides an uplink channel transmission method. As shown in FIG. 5, the method includes the following steps.

301. A base station transmits capability indication information to UE.

The capability indication information is used to indicate that the UE transmits both a channel corresponding to a long TTI and a channel corresponding to a short TTI.

To implement a shorter RTT and a shorter data transmission delay, it has been proposed that a TTI length is set to 0.5 ms or set to be shorter. Therefore, the UE may transmit a short-delay service (for example, a small packet/a voice) by using a 0.5 ms TTI on a cell (cell), and transmit a service with a large data volume (for example, a video or downloading) by using a 1 ms TTI on the cell. Therefore, the UE can support both the long TTI (for example, the 1 ms TTI) and the short TTI (for example, the 0.5 ms TTI), and the UE can transmit both the channel corresponding to the long TTI and the channel corresponding to the short TTI.

302. The UE receives the capability indication information transmitted by the base station.

303. The UE determines to transmit information by using a first channel on a first time unit numbered i, and transmit information by using second channels on m second time units numbered j.

Duration of the first time unit is a first transmission time interval TTI, duration of the second time unit is a second TTI, and duration of the second TTI is shorter than duration of the first TTI.

In addition, the first time unit may be a subframe having a length of 1 ms, a timeslot having a length of 0.5 ms, one or more SC-FDMA symbols, or one or more OFDMA symbols; and the second time unit may be a timeslot having a length of 0.5 ms, one or more SC-FDMA symbols, one or more OFDMA symbols, or a time unit shorter than an SC-FDMA symbol or an OFDMA symbol. The first cell and a second cell may correspond to one or more base stations. For example, the first TTI may be 1 ms, and the second TTI may be 0.5 ms. The first TTI may be 0.5 ms, and the second TTI may be one SC-FDMA symbol.

It should be noted that first channels on n first time units numbered i may be understood that each first time unit numbered i includes one first channel, that is, it is equivalent to that n first channels exist. The second channels on the m second time units numbered j may be understood that each second time unit numbered j includes one second channel, that is, it is equivalent to that m second channels exist.

304. The UE determines a maximum uplink transmission time difference between the n first time units numbered i and the m second time units numbered j, and allocates transmit power to L uplink channels according to the maximum uplink transmission time difference, where the L uplink channels include at least k second channels in the m second channels.

The maximum uplink transmission time difference is a maximum difference between n start transmission time points of the n first time units numbered i and m start transmission time points of the m second time units numbered j. It should be noted that a start transmission time point may be a start transmission moment of the first time unit or the second time unit, or a start transmission moment of the first channel or the second channel.

Certainly, the L uplink channels are selected by the UE from (m+n) channels (the n first channels and the m second channels) according to a channel priority. The k second channels corresponding to the short TTI may be channels carrying an important service or channels carrying a delay-sensitive service. Therefore, when the L uplink channels include the k second channels, it can be ensured that a service carried on a channel carrying an important service or a delay-sensitive channel in the uplink channels is properly received by the base station, so as to avoid a case in which a data service carried on the second channel is affected when no transmit power is allocated to the second channel and the second channel cannot be transmitted because the UE allocates all the transmit power to the first channel.

In a specific example of the present disclosure, the allocating, by the UE, transmit power to L uplink channels according to the maximum uplink transmission time difference, where the L uplink channels include at least k second channels, and $1 \le k \le m$ specifically includes the following three cases:

In a first case, when the maximum uplink transmission time difference is greater than or equal to a first preset value, and a start transmission time point of the first time unit numbered i is earlier than a start transmission time point of the second time unit numbered j, the UE allocates a first power value to the k second channels in the m second channels according to a first channel priority. The first power value is less than maximum transmit power of the UE.

Priority levels in descending order according to the first channel priority are as follows:

a physical random access channel PRACH, a channel carrying a hybrid automatic repeat request-acknowledgment HARQ-ACK or a scheduling request SR, a channel carrying channel state information CSI, a channel carrying only data, and a sounding reference signal SRS; or priority levels in descending order according to the first channel priority are as follows: a PRACH, a physical uplink control channel PUCCH, a physical uplink shared channel PUSCH, and an SRS.

Further, the UE allocates remaining power to at least one of the n first channels according to the first channel priority. The remaining power is a difference between the maximum transmit power of the UE and the first power value.

In this case, the L uplink channels further include at least one first channel selected from the n first channels.

In a second case, when the maximum uplink transmission time difference is greater than or equal to a first preset value, and a start transmission time point of the first time unit numbered i is earlier than a start transmission time point of the second time unit numbered j, the UE allocates a first power value to the k second channels in the m second channels according to a first channel priority, and allocates a second power value to z first channels in the n first channels according to the first channel priority. A sum of the first power value and the second power value is less than maximum transmit power of the UE.

In this case, the L uplink channels further include the z first channels in the n first channels, where $1 \leq z \leq n$.

It should be noted that, that the first time unit numbered i is earlier than the second time unit numbered j can be understood that all the start transmission time points of the n first time units are earlier than all the start transmission time points of the m second time units, or a start transmission time point of a primary first time unit in the n first time units is earlier than a start transmission time point of a primary second time unit in the m second time units. Definitions of the primary first time unit and the primary second time unit are the same as the foregoing definitions, and details are not described again.

Further, the UE allocates remaining power to at least one of (m−k) second channels in the m second channels other than the k second channels according to the first channel priority. The remaining power is a difference between the maximum transmit power of the UE and the sum of the first power value and the second power value.

In this case, the L uplink channels further include at least one second channel selected from the (m−k) second channels in the m second channels other than the k second channels.

In a third case, when the maximum uplink transmission time difference is less than or equal to a second preset value, the UE allocates maximum transmit power of the UE to the k second channels in the m second channels according to a second channel priority; or when the maximum uplink transmission time difference is greater than or equal to a third preset value, and a start transmission time point of the second time unit numbered j is earlier than a start transmission time point of the first time unit numbered i, the UE allocates maximum transmit power of the UE to the k second channels in the m second channels according to a second channel priority.

Priority levels in descending order according to the second channel priority are as follows: the second channel and the first channel. In addition, power is allocated to the first channel according to a first channel priority, and power is allocated to the second channel according to the first channel priority.

In addition, the allocating, by the UE, transmit power to L uplink channels according to the maximum uplink transmission time difference may further include: when the maximum uplink transmission time difference is less than or equal to a second preset value, or when the maximum uplink transmission time difference is greater than or equal to a third preset value, and the second time unit numbered j is earlier than the first time unit numbered i, allocating, by the UE, maximum transmit power of the UE to the k second channels in the m second channels and z first channels in the n first channels according to a third channel priority.

In this case, the L uplink channels further include the z first channels.

In this case, the UE allocates power to the first (k+z) channels in the (m+n) channels in descending order of priorities, and the (m+n) channels include the m second channels and the n first channels in total. Therefore, k may be 0, or z may be 0.

Priority levels in descending order according to the third channel priority are as follows: a PRACH in the first channels, a second channel other than an SRS in the second channels, a first channel carrying an HARQ-ACK or SR in the first channels, a first channel carrying CSI in the first channels, a first channel carrying only data, the SRS in the second channels, and an SRS in the first channels; or a PRACH in the first channels, a second channel other than an SRS in the second channels and a second channel carrying only data, a first channel carrying an HARQ-ACK or SR, the second channel carrying only data, a first channel carrying only data, the SRS in the second channels, and an SRS in the first channels.

It should be noted that the first power value specifically includes: a transmit power value used when the UE transmits an uplink channel corresponding to a second cell on a second time unit numbered (j−1); or a transmit power value used when the UE transmits a channel of a second cell last time; or a power value reserved by the UE for an uplink channel corresponding to the second TTI according to a predefined parameter. For example, the predefined parameter may be a transmit power ratio r1. The UE determines, according to the predefined parameter, that the reserved power value is a product of r1 and a maximum transmit power value currently allowed by the UE. For example, the predefined parameter may be a power value. The UE determines that the reserved power value is a fixed power value. Alternatively, the UE reserves the power value for the uplink channel corresponding to the second TTI according to received reserved power information of the second TTI. For example, the reserved power information may be a transmit power ratio r2 configured by the base station. The UE determines, according to the reserved power information, that the reserved power value is a product of r2 and a maximum transmit power value currently allowed by the UE. For example, the reserved power information may be a power value configured by the base station. The UE determines that the reserved power value is the power value configured by the base station.

It should be noted that the second time unit numbered (j−1) is adjacent to the second time unit numbered j, and a start transmission time point of the second time unit numbered (j−1) is earlier than the start transmission time point of the second time unit numbered j. The first power value is the transmit power value used when the UE transmits the channel of the second cell last time, that is, the transmit power value used to transmit the second cell for an $n^{th}$ time is the same as the transmit power value used to transmit the second cell for an $(n-1)^{th}$ time.

The second power value specifically includes: a transmit power value used when the UE transmits an uplink channel corresponding to a first cell on a first time unit numbered (i−1); or a transmit power value used when the UE transmits a channel of a first cell last time; or a power value reserved by the UE for an uplink channel corresponding to the first TTI according to a predefined parameter; or a power value reserved by the UE for an uplink channel corresponding to the first TTI according to received reserved power information of the first TTI.

In this example, it should be noted that the UE first allocates power to a channel with a highest priority, then allocates power to a remaining channel with a high priority, and finally considers allocating power to a channel with a low priority. Each carrier has its own uplink transmit power upper limit. Even though channel transmit power of each carrier does not exceed a power upper limit of each carrier, total transmit power of a plurality of channels may still exceed configured maximum transmit power of the UE. In this case, the UE may first allocate power to the channel with a high priority, and then consider allocating power to the channel with a low priority. If power is insufficient for the UE to allocate to the channel with a high priority, there is no transmit power for the channel with a low priority. However, when channel priorities are the same or channel power allocation priorities are not distinguished, if transmit power required by the plurality of channels exceeds maximum transmit power of the UE, power scaling, that is, power compression is performed.

305. The UE transmits the L uplink channels.

The transmit power is allocated to the L uplink channels in step 304, so as to ensure that the k second channels are transmitted, and prevent service communication between the UE and the base station from being affected because data carried on the k second channels cannot be transmitted.

In a preferred example of the present disclosure, when it is determined that at least one first time unit numbered i and at least one second time unit numbered j overlap in step 303, a first channel on the at least one first time unit numbered i and a second channel on the at least one second time unit numbered j further need to overlap, so that steps 304 and 305 can be performed in this example of the present disclosure.

The present disclosure provides the uplink channel transmission method. The UE determines the n first channels (uplink channels corresponding to the long TTI) and the m second channels (uplink channels corresponding to the short TTI), and allocates the transmit power to the L uplink channels according to the maximum uplink transmission time difference between the n first channels and the m second channels. The L uplink channels include at least the k second channels in the m second channels, and the first TTI corresponding to the first channel is shorter than the second TTI corresponding to the second channel. The UE transmits the L uplink channels. Because a scenario in which the UE supports both the long TTI and the short TTI does not occur currently, it can be ensured that the UE allocates the transmit power to only the uplink channel corresponding to the long TTI. Once the UE supports both the long TTI and the short TTI, when transmitting an uplink channel, the UE learns information about the uplink channel corresponding to the long TTI, and does not learn information about the uplink channel corresponding to the short TTI. The UE allocates all the transmit power to the uplink channel corresponding to the long TTI. Consequently, no power is allocated to the uplink channel corresponding to the short TTI, and the uplink channel corresponding to the short TTI cannot be transmitted. According to the method provided in the present disclosure, it can be ensured that the transmit power is allocated to the uplink channel corresponding to the short TTI. Therefore, it is ensured that the uplink channel corresponding to the short TTI can be transmitted, so that a service carried on the uplink channel corresponding to the short TTI is properly received by the base station.

Figure 6:
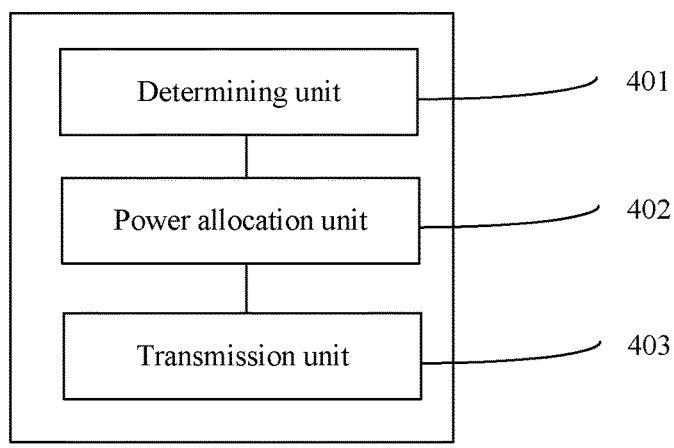
FIG. 6 is a schematic structural diagram of UE according to yet another of the present disclosure.

This example of the present disclosure provides UE. As shown in FIG. 6, the UE includes a determining unit 401, a power allocation unit 402, and a transmission unit 403.

The determining unit 401 determines to transmit information by using first channels on n first time units numbered i, and transmit information by using second channels on m second time units numbered j, where a length of the first time unit numbered i is a first transmission time interval TTI, a length of the second time unit numbered j is a second TTI, the second TTI is shorter than the first TTI, at least one first time unit numbered i and at least one second time unit numbered j overlap, and information transmitted by using the first channel and information transmitted by using the second channel respectively correspond to different cells.

For example, the first time unit may be a subframe having a length of 1 ms, a timeslot having a length of 0.5 ms, one or more SC-FDMA symbols, or one or more OFDMA symbols; and the second time unit may be a timeslot having a length of 0.5 ms, one or more SC-FDMA symbols, one or more OFDMA symbols, or a time unit shorter than an SC-FDMA symbol or an OFDMA symbol. The first cell and a second cell may correspond to one or more base stations. For example, the first TTI may be 1 ms, and the second TTI may be 0.5 ms.

The determining unit 401 is further configured to determine a maximum uplink transmission time difference between the n first time units numbered i and the m second time units numbered j, where the maximum uplink transmission time difference is a maximum difference between n start transmission time points of the n first time units numbered i and m start transmission time points of the m second time units numbered j.

The power allocation unit 402 is configured to allocate transmit power to L uplink channels according to the maximum uplink transmission time difference, where the L uplink channels include at least k second channels in the m second channels.

In this way, when the UE can support both a long TTI and a short TTI, the UE needs to allocate the transmit power to an uplink channel corresponding to the short TTI, so that the uplink channel corresponding to the short TTI can be transmitted, and a service carried on the uplink channel corresponding to the short TTI is properly received by a base station. In addition, when k is less than L, that is, when the UE may further allocate transmit power to the first channel (an uplink channel corresponding to the long TTI), the UE can allocate power to both the uplink channel corresponding to the long TTI (that is, the first TTI in the present disclosure) and the uplink channel corresponding to the short TTI (that is, the second TTI in the present disclosure), so as to ensure that services carried on the channels are received by the base station.

Certainly, the L uplink channels are selected by the UE from (m+n) channels (n first channels and the m second channels) according to a channel priority. The k second channels corresponding to the short TTI may be channels carrying an important service or channels carrying a delay-sensitive service. Therefore, when the L uplink channels include the k second channels, it can be ensured that a service carried on a channel carrying an important service or a delay-sensitive channel in the uplink channels is properly received by the base station.

The transmission unit 403 is configured to transmit the L uplink channels.

It should be noted that a first channel on the at least one first time unit numbered i and a second channel on the at least one second time unit numbered j overlap.

The power allocation unit 402 is specifically configured to: when the maximum uplink transmission time difference is greater than or equal to a first preset value, and a start transmission time point of the first time unit numbered i is earlier than a start transmission time point of the second time unit numbered j, allocate a first power value to the k second channels in the m second channels according to a first channel priority, where the first power value is less than or equal to maximum transmit power of the UE, and $1 \leq k \leq m$.

The power allocation unit 402 is further configured to allocate remaining power to at least one of the n first channels according to the first channel priority, where the remaining power is a difference between the maximum transmit power of the UE and the first power value.

It should be noted that because the UE performs allocation according to the first channel priority, the UE can allocate the remaining power to all first channels, or allocate the remaining power to some first channels. This is not limited herein. For example, if the remaining power is 5 dBm, a priority of a first channel A is highest, a priority of a first channel B is second highest, the first channel A requires power of 3 dBm, and the second channel B requires power of 2 dBm, the remaining power is allocated to two first channels, and the L uplink channels further include the two first channels, that is, the first channel A and the first channel B.

In this case, the L uplink channels further include at least one first channel selected from the n first channels.

The power allocation unit 402 is specifically configured to: when the maximum uplink transmission time difference is greater than or equal to a first preset value, and a start transmission time point of the first time unit numbered i is earlier than a start transmission time point of the second time unit numbered j, allocate a first power value to the k second channels in the m second channels according to a first channel priority, and allocate a second power value to z first channels in the n first channels according to the first channel priority, where a sum of the first power value and the second power value is less than or equal to maximum transmit power of the UE, and $1 \leq k \leq m$.

In this case, the L uplink channels further include the z first channels in the n first channels, where $1 \leq z \leq n$.

It should be noted that because the UE selects the k second channels from the m second channels according to the first channel priority, the k second channels are the first k channels in the m second channels sorted in descending order according to the first channel priority. Likewise, the z first channels are the first z channels in the n first channels sorted in descending order according to the first channel priority. For example, if the first power value is 10 dBm, one PRACH with a highest priority requires transmit power of 6 dBm, and one second channel with a relatively low priority carrying an SR requires transmit power of 4 dBm, the UE allocates the first power value to one PRACH and one second channel carrying an SR. In this case, k=2. If the second power value is 8 dBm, one PRACH with a highest priority requires transmit power of 6 dBm, one first channel with a relatively low priority carrying an SR requires transmit power of 4 dBm, and a first channel carrying channel state information CSI requires transmit power of 4 dBm, the second power value is first allocated to the PRACH, and then is allocated to the first channel carrying an SR. Because remaining power of 2 dBm in the second power value does not meet the transmit power required by the first channel carrying an SR, the first channel carrying an SR can be transmitted only by using 2 dBm, and finally, no remaining power is allocated to the first channel carrying CSI. Consequently, the first channel carrying CSI cannot be transmitted. Therefore, the UE allocates the second power value to one PRACH and one first channel carrying an SR. In this case, z=2.

The power allocation unit 402 is further configured to allocate remaining power to at least one of (m−k) second channels in the m second channels other than the k second channels according to the first channel priority, where the remaining power is a difference between the maximum transmit power of the UE and the sum of the first power value and the second power value.

In this case, the L uplink channels further include at least one second channel selected from the (m−k) second channels in the m second channels other than the k second channels.

The power allocation unit 402 is specifically configured to: when the maximum uplink transmission time difference is less than or equal to a second preset value, first allocate maximum transmit power of the UE to the k second channels in the m second channels according to a second channel priority; or when the maximum uplink transmission time difference is greater than or equal to a third preset value, and a start transmission time point of the second time unit numbered j is earlier than a start transmission time point of the first time unit numbered i, first allocate maximum transmit power of the UE to the k second channels in the m second channels according to a second channel priority, where $1 \leq k \leq m$.

Priority levels in descending order according to the second channel priority are as follows: the second channel and the first channel. In addition, power is allocated to the first channel according to a first channel priority, and power is allocated to the second channel according to the first channel priority.

The power allocation unit 402 is specifically configured to: when the maximum uplink transmission time difference is less than or equal to a second preset value, first allocate maximum transmit power of the UE to the k second channels in the m second channels and z first channels in the n first channels according to a third channel priority; or when the maximum uplink transmission time difference is greater than or equal to a third preset value, and a start transmission time point of the second time unit numbered j is earlier than a start transmission time point of the first time unit numbered i, first allocate maximum transmit power of the UE to the k second channels in the m second channels and z first channels in the n first channels according to a third channel priority.

It should be noted herein that the UE allocates power to the first (k+z) channels in the (m+n) channels sorted in descending order of priorities, and the (m+n) channels include the m second channels and the n first channels in total. Therefore, k may be 0, or z may be 0.

In this case, the L uplink channels further include the z first channels.

The first power value specifically includes: a transmit power value used when the UE transmits an uplink channel corresponding to a second cell on a second time unit numbered (j−1); or a transmit power value used when the UE transmits a channel of a second cell last time; or a power value reserved by the UE for an uplink channel corresponding to the second TTI according to a predefined parameter;

or a power value reserved by the UE for an uplink channel corresponding to the second TTI according to received reserved power information of the second TTI.

The second power value specifically includes: a transmit power value used when the UE transmits an uplink channel corresponding to a first cell on a first time unit numbered (i−1); or a transmit power value used when the UE transmits a channel of a first cell last time; or a power value reserved by the UE for an uplink channel corresponding to the first TTI according to a predefined parameter; or a power value reserved by the UE for an uplink channel corresponding to the first TTI according to received reserved power information of the first TTI.

Priority levels in descending order according to the first channel priority are as follows: a physical random access channel PRACH, a channel carrying a hybrid automatic repeat request-acknowledgment HARQ-ACK or a scheduling request SR, a channel carrying channel state information CSI, a channel carrying only data, and a sounding reference signal SRS; or priority levels in descending order according to the first channel priority are as follows: a PRACH, a physical uplink control channel PUCCH, a physical uplink shared channel PUSCH, and an SRS.

Priority levels in descending order according to the third channel priority are as follows: a PRACH in the first channels, a second channel other than a sounding reference signal SRS in the second channels, a first channel carrying an HARQ-ACK or SR in the first channels, a first channel carrying CSI in the first channels, a first channel carrying only data, the SRS in the second channels, and an SRS in the first channels; or a PRACH in the first channels, a second channel other than an SRS in the second channels and a second channel carrying only data, a first channel carrying an HARQ-ACK or SR, the second channel carrying only data, a first channel carrying only data, the SRS in the second channels, and an SRS in the first channels.

The transmission unit is further configured to report capability information, where the capability information is used to indicate that the UE can support transmitting and/or receiving both a channel corresponding to a long TTI and a channel corresponding to a short TTI.

Alternatively, the UE further includes a receiving unit, and the receiving unit is configured to receive capability indication information, where the capability indication information is used to indicate that the UE transmits and/or receives both a channel corresponding to a long TTI and a channel corresponding to a short TTI.

The first preset value, the second preset value, and the third preset value are parameters pre-stored by the UE; or the first preset value, the second preset value, and the third preset value are determined by the UE according to received power control indication information.

The present disclosure provides the UE. The UE determines the n first channels (uplink channels corresponding to the long TTI) and the m second channels (uplink channels corresponding to the short TTI), and allocates the transmit power to the L uplink channels according to the maximum uplink transmission time difference between the n first channels and the m second channels. The L uplink channels include at least the k second channels in the m second channels, 1≤k≤m, and the first TTI corresponding to the first channel is shorter than the second TTI corresponding to the second channel. The UE transmits the L uplink channels. Because a scenario in which the UE supports both the long TTI and the short TTI does not occur currently, it can be ensured that the UE allocates the transmit power to only the uplink channel corresponding to the long TTI. Once the UE supports both the long TTI and the short TTI, the transmit power cannot be allocated to the uplink channel corresponding to the short TTI. Consequently, no power is allocated to the uplink channel corresponding to the short TTI, and the uplink channel corresponding to the short TTI cannot be transmitted. According to the UE provided in the present disclosure, when the UE supports both the long TTI and the short TTI, it can be ensured that the transmit power is allocated to the uplink channel corresponding to the short TTI. Therefore, it can be ensured that the uplink channel corresponding to the short TTI is transmitted, so that a service carried on the uplink channel corresponding to the short TTI is properly received by the base station.

Figure 7:
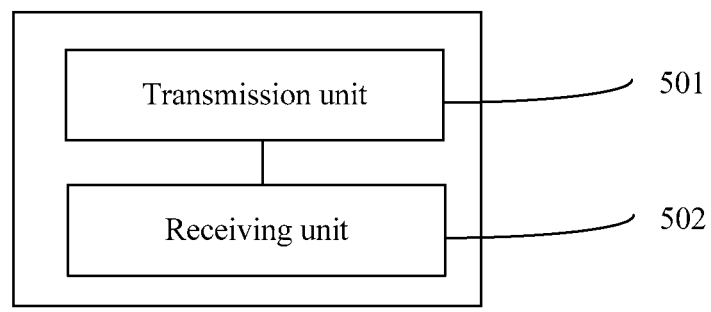
FIG. 7 is a schematic structural diagram of a base station according to yet a further example of the present disclosure.

This example of the present disclosure provides a base station. As shown in FIG. 7, the base station includes a transmission unit 501 and a receiving unit 502.

The transmission unit 501 is configured to: transmit reserved power information of a first transmission time interval TTI and reserved power information of a second TTI to user equipment UE, so that the UE allocates transmit power to L uplink channels according to the reserved power information of the first TTI and the reserved power information of the second TTI when a first time unit numbered i and a second time unit numbered j overlap in terms of time; or transmit reserved power information of a second TTI to UE, so that the UE allocates transmit power to a L uplink channels according to the reserved power information of the second TTI when a first time unit numbered i and a second time unit numbered j overlap in terms of time.

For example, the first time unit may be a subframe having a length of 1 ms, a timeslot having a length of 0.5 ms, one or more SC-FDMA symbols, or one or more OFDMA symbols. The second time unit may be a timeslot having a length of 0.5 ms, one or more SC-FDMA symbols, one or more OFDMA symbols, or a time unit shorter than an SC-FDMA symbol or an OFDMA symbol. The first cell and a second cell may correspond to one or more base stations. For example, the first TTI may be 1 ms, and the second TTI may be 0.5 ms.

The receiving unit 502 is configured to receive the L uplink channels transmitted by the UE.

It should be noted that the L uplink channels include at least k second channels in the m second channels, 1≤k≤m, the second channel is an uplink channel corresponding to the second cell on the second time unit numbered j, duration of the first time unit is the first TTI, duration of the second time unit is the second TTI, and duration of the second TTI is shorter than duration of the first TTI.

The L uplink channels further include z first channels in n first channels, and the first channel is an uplink channel corresponding to a first cell on the first time unit numbered i.

The transmission unit 501 is further configured to transmit capability indication information to the UE, where the capability indication information is used to indicate that the UE transmits and/or receives both a channel corresponding to a long TTI and a channel corresponding to a short TTI.

Alternatively, the receiving unit 502 is further configured to receive capability information reported by the UE, where the capability information is used to indicate that the UE supports transmitting and/or receiving both a channel corresponding to a long TTI and a channel corresponding to a short TTI.

The transmission unit 501 is further configured to transmit power control indication information to the UE, where the power control indication information is used to indicate that the UE determines a first preset value, a second preset value, and a third preset value.

The base station provided in the present disclosure transmits the reserved power information of the first transmission time interval TTI and/or the reserved power information of the second TTI to the UE, so that the UE allocates the transmit power to the L uplink channels. The L uplink channels include at least the k second channels in the m second channels. Because a scenario in which the UE supports both the long TTI and the short TTI does not occur currently, it can be ensured that the UE allocates the transmit power to only the uplink channel corresponding to the long TTI. Once the UE supports both the long TTI and the short TTI, the transmit power cannot be allocated to the uplink channel corresponding to the short TTI. Consequently, no power is allocated to the uplink channel corresponding to the short TTI, and the uplink channel corresponding to the short TTI cannot be transmitted. According to the method, the UE, and the base station provided in the present disclosure, when the UE supports both the long TTI and the short TTI, it can be ensured that the transmit power is allocated to the uplink channel corresponding to the short TTI. Therefore, it can be ensured that the uplink channel corresponding to the short TTI is transmitted, so that a service carried on the uplink channel corresponding to the short TTI is properly received by the base station.

Figure 8:
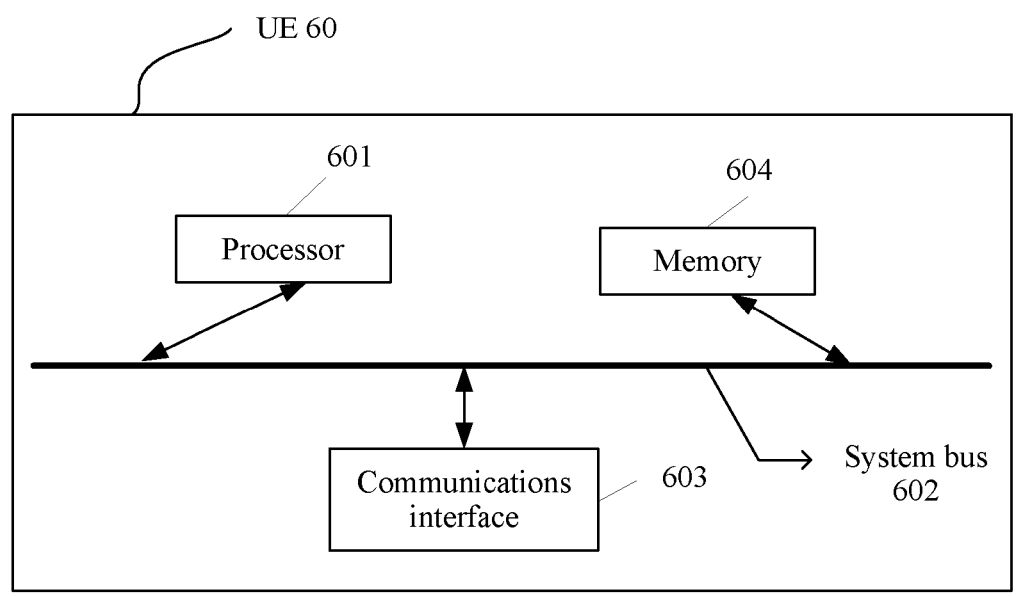
FIG. 8 is a schematic structural diagram of UE according to an additional example of the present disclosure.

This example of the present disclosure provides UE. As shown in FIG. 8, the UE may include a processor 601, a system bus 602, a communications interface 603, and a memory 604.

The processor 601 may be a central processing unit (English: central processing unit, CPU for short).

The memory 604 is configured to store program code, and transmit the program code to the processor 601. The processor 601 executes the following instructions according to the program code. The memory 604 may include a volatile memory (English: volatile memory), such as a random-access memory (RAM). The memory 604 may also include a nonvolatile memory (English: non-volatile memory), such as a read-only memory (ROM), a flash memory (English: flash memory), a hard disk drive (HDD), or a solid state drive (SSD). The memory 604 may further include a combination of the foregoing types of memories. The processor 601, the memory 604, and the communications interface 603 are connected and perform mutual communication by using the system bus 602.

The communications interface 603 may be implemented by an optical transceiver, an electrical transceiver, a wireless transceiver, or any combination thereof. For example, the optical transceiver may be a small form-factor pluggable (SFP) transceiver (English: transceiver), an enhanced small form-factor pluggable (SFP+) transceiver, or a 10-GB small form-factor pluggable (XFP) transceiver. The electrical transceiver may be an Ethernet (English: Ethernet) network interface controller (NIC). The wireless transceiver may be a wireless network interface controller (WNIC). The UE 60 may include a plurality of communications interfaces 603.

The processor 601 is configured to determine to transmit information by using first channels on n first time units numbered i, and transmit information by using second channels on m second time units numbered j, where a length of the first time unit numbered i is a first transmission time interval TTI, a length of the second time unit numbered j is a second TTI, the second TTI is shorter than the first TTI, at least one first time unit numbered i and at least one second time unit numbered j overlap, and information transmitted by using the first channel and information transmitted by using the second channel respectively correspond to different cells.

It should be noted that the first channels on the n first time units numbered i may be understood that each first time unit numbered i includes one first channel, that is, it is equivalent to that n first channels exist. The second channels on the m second time units numbered j may be understood that each second time unit numbered j includes one second channel, that is, it is equivalent to that m second channels exist.

For example, the first time unit may be a subframe having a length of 1 ms, a timeslot having a length of 0.5 ms, one or more SC-FDMA symbols, or one or more OFDMA symbols. The second time unit may be a timeslot having a length of 0.5 ms, one or more SC-FDMA symbols, one or more OFDMA symbols, or a time unit shorter than an SC-FDMA symbol or an OFDMA symbol. The first cell and a second cell may correspond to one or more base stations. For example, the first TTI may be 1 ms, and the second TTI may be 0.5 ms.

The processor 601 is further configured to determine a maximum uplink transmission time difference between the n first time units numbered i and the m second time units numbered j, where the maximum uplink transmission time difference is a maximum difference between n start transmission time points of the n first time units numbered i and m start transmission time points of the m second time units numbered j. It should be noted that a start transmission time point may be a start transmission moment of the first time unit or the second time unit, or a start transmission moment of the first channel or the second channel.

The processor 601 is further configured to allocate transmit power to L uplink channels according to the maximum uplink transmission time difference, where the L uplink channels include at least k second channels in the m second channels.

The processor 601 is configured to transmit the L uplink channels by using the communications interface 603.

It should be noted that a first channel on the at least one first time unit numbered i and a second channel on the at least one second time unit numbered j overlap.

In this way, when the UE can support both a long TTI and a short TTI, the UE needs to allocate transmit power to an uplink channel corresponding to the short TTI, so that the uplink channel corresponding to the short TTI can be transmitted, and a service carried on the uplink channel corresponding to the short TTI is properly received by a base station. In addition, when k is less than L, that is, when the UE may further allocate transmit power to the first channel (an uplink channel corresponding to the long TTI), the UE can allocate power to both the uplink channel corresponding to the long TTI (that is, the first TTI in the present disclosure) and the uplink channel corresponding to the short TTI (that is, the second TTI in the present disclosure), so as to ensure that services carried on the channels are received by the base station.

Certainly, the L uplink channels are selected by the UE from (m+n) channels (the n first channels and the m second channels) according to a channel priority. The k second channels corresponding to the short TTI may be channels carrying an important service or channels carrying a delay-sensitive service. Therefore, when the L uplink channels include the k second channels, it can be ensured that a service carried on a channel carrying an important service or a delay-sensitive channel in the uplink channels is properly received by the base station.

The processor 601 is specifically configured to: when the maximum uplink transmission time difference is greater than or equal to a first preset value, and a start transmission time point of the first time unit numbered i is earlier than a start transmission time point of the second time unit numbered j, allocate a first power value to the k second channels in the m second channels according to a first channel priority, where the first power value is less than or equal to maximum transmit power of the UE, and $1 \leq k \leq m$.

The processor 601 is further configured to allocate remaining power to at least one of the n first channels according to the first channel priority, where the remaining power is a difference between the maximum transmit power of the UE and the first power value.

It should be noted that because the UE performs allocation according to the first channel priority, the UE can allocate the remaining power to all first channels, or allocate the remaining power to some first channels. This is not limited herein. For example, if the remaining power is 5 dBm, a priority of a first channel A is highest, a priority of a first channel B is second highest, the first channel A requires power of 3 dBm, and the second channel B requires power of 2 dBm, the remaining power is allocated to two first channels, and the L uplink channels further include the two first channels, that is, the first channel A and the first channel B.

In this case, the L uplink channels further include at least one first channel selected from the n first channels.

The processor 601 is specifically configured to: when the maximum uplink transmission time difference is greater than or equal to a first preset value, and a start transmission time point of the first time unit numbered i is earlier than a start transmission time point of the second time unit numbered j, allocate a first power value to the k second channels in the m second channels according to a first channel priority, and allocate a second power value to z first channels in the n first channels according to the first channel priority, where a sum of the first power value and the second power value is less than or equal to maximum transmit power of the UE, and $1 \leq k \leq m$.

In this case, the L uplink channels further include the z first channels in the n first channels, where $1 \leq z \leq n$.

It should be noted that because the UE selects the k second channels from the m second channels according to the first channel priority, the k second channels are the first k channels in the m second channels sorted in descending order according to the first channel priority. Likewise, the z first channels are the first z channels in the n first channels sorted in descending order according to the first channel priority. For example, if the first power value is 10 dBm, one PRACH with a highest priority requires transmit power of 6 dBm, and one second channel with a relatively low priority carrying an SR requires transmit power of 4 dBm, the UE allocates the first power value to one PRACH and one second channel carrying an SR. In this case, k=2. If the second power value is 8 dBm, one PRACH with a highest priority requires transmit power of 6 dBm, one first channel with a relatively low priority carrying an SR requires transmit power of 4 dBm, and a first channel carrying channel state information CSI requires transmit power of 4 dBm, the second power value is first allocated to the PRACH, and then is allocated to the first channel carrying an SR. Because remaining power of 2 dBm in the second power value does not meet the transmit power required by the first channel carrying an SR, the first channel carrying an SR can be transmitted only by using 2 dBm, and finally, no remaining power is allocated to the first channel carrying CSI. Consequently, the first channel carrying CSI cannot be transmitted. Therefore, the UE allocates the second power value to one PRACH and one first channel carrying an SR. In this case, z=2.

The processor 601 is further configured to allocate remaining power to at least one of (m−k) second channels in the m second channels other than the k second channels according to the first channel priority, where the remaining power is a difference between the maximum transmit power of the UE and the sum of the first power value and the second power value.

In this case, the L uplink channels further include at least one second channel selected from the (m−k) second channels in the m second channels other than the k second channels.

The processor 601 is specifically configured to: when the maximum uplink transmission time difference is less than or equal to a second preset value, first allocate maximum transmit power of the UE to the k second channels in the m second channels according to a second channel priority; or when the maximum uplink transmission time difference is greater than or equal to a third preset value, and a start transmission time point of the second time unit numbered j is earlier than a start transmission time point of the first time unit numbered i, first allocate maximum transmit power of the UE to the k second channels in the m second channels according to a second channel priority, where $1 \leq k \leq m$.

Priority levels in descending order according to the second channel priority are as follows: the second channel and the first channel. In addition, power is allocated to the first channel according to a first channel priority, and power is allocated to the second channel according to the first channel priority.

The processor 601 is specifically configured to: when the maximum uplink transmission time difference is less than or equal to a second preset value, first allocate maximum transmit power of the UE to the k second channels in the m second channels and z first channels in the n first channels according to a third channel priority; or when the maximum uplink transmission time difference is greater than or equal to a third preset value, and a start transmission time point of the second time unit numbered j is earlier than a start transmission time point of the first time unit numbered i, first allocate maximum transmit power of the UE to the k second channels in the m second channels and z first channels in the n first channels according to a third channel priority. In this case, the L uplink channels further include the z first channels.

It should be noted herein that the UE allocates power to the first (k+z) channels in the (m+n) channels sorted in descending order of priorities, and the (m+n) channels include the m second channels and the n first channels in total. Therefore, k may be 0, or z may be 0.

The first power value specifically includes: a transmit power value used when the UE transmits an uplink channel corresponding to a second cell on a second time unit numbered (j−1); or a transmit power value used when the UE transmits a channel of a second cell last time; or a power value reserved by the UE for an uplink channel corresponding to the second TTI according to a predefined parameter; or a power value reserved by the UE for an uplink channel corresponding to the second TTI according to received reserved power information of the second TTI.

The second power value specifically includes: a transmit power value used when the UE transmits an uplink channel corresponding to a first cell on a first time unit numbered (i−1); or a transmit power value used when the UE transmits a channel of a first cell last time; or a power value reserved by the UE for an uplink channel corresponding to the first TTI according to a predefined parameter; or a power value reserved by the UE for an uplink channel corresponding to the first TTI according to received reserved power information of the first TTI.

Priority levels in descending order according to the first channel priority are as follows: a physical random access channel PRACH, a channel carrying a hybrid automatic repeat request-acknowledgment HARQ-ACK or a scheduling request SR, a channel carrying channel state information CSI, a channel carrying only data, and a sounding reference signal SRS; or priority levels in descending order according to the first channel priority are as follows: a PRACH, a physical uplink control channel PUCCH, a physical uplink shared channel PUSCH, and an SRS.

Priority levels in descending order according to the third channel priority are as follows: a PRACH in the first channels, a second channel other than a sounding reference signal SRS in the second channels, a first channel carrying an HARQ-ACK or SR in the first channels, a first channel carrying CSI in the first channels, a first channel carrying only data, the SRS in the second channels, and an SRS in the first channels; or a PRACH in the first channels, a second channel other than an SRS in the second channels and a second channel carrying only data, a first channel carrying an HARQ-ACK or SR, the second channel carrying only data, a first channel carrying only data, the SRS in the second channels, and an SRS in the first channels.

The transmission unit is further configured to report capability information, where the capability information is used to indicate that the UE can support transmitting and/or receiving both a channel corresponding to a long TTI and a channel corresponding to a short TTI.

Alternatively, the UE further includes a receiving unit, and the receiving unit is configured to receive capability indication information, where the capability indication information is used to indicate that the UE transmits and/or receives both a channel corresponding to a long TTI and a channel corresponding to a short TTI.

The first preset value, the second preset value, and the third preset value are parameters pre-stored by the UE; or the first preset value, the second preset value, and the third preset value are determined by the UE according to received power control indication information.

The present disclosure provides the UE. The UE determines the n first channels (uplink channels corresponding to the long TTI) and the m second channels (uplink channels corresponding to the short TTI), and allocates the transmit power to the L uplink channels according to the maximum uplink transmission time difference between the n first channels and the m second channels. The L uplink channels include at least the k second channels in the m second channels, 1≤k≤m, and the first TTI corresponding to the first channel is shorter than the second TTI corresponding to the second channel. The UE transmits the L uplink channels. Because a scenario in which the UE supports both the long TTI and the short TTI does not occur currently, it can be ensured that the UE allocates the transmit power to only the uplink channel corresponding to the long TTI. Once the UE supports both the long TTI and the short TTI, the transmit power cannot be allocated to the uplink channel corresponding to the short TTI. Consequently, no power is allocated to the uplink channel corresponding to the short TTI, and the uplink channel corresponding to the short TTI cannot be transmitted. According to the UE provided in the present disclosure, when the UE supports both the long TTI and the short TTI, it can be ensured that the transmit power is allocated to the uplink channel corresponding to the short TTI. Therefore, it can be ensured that the uplink channel corresponding to the short TTI is transmitted, so that a service carried on the uplink channel corresponding to the short TTI is properly received by the base station.

Figure 9:
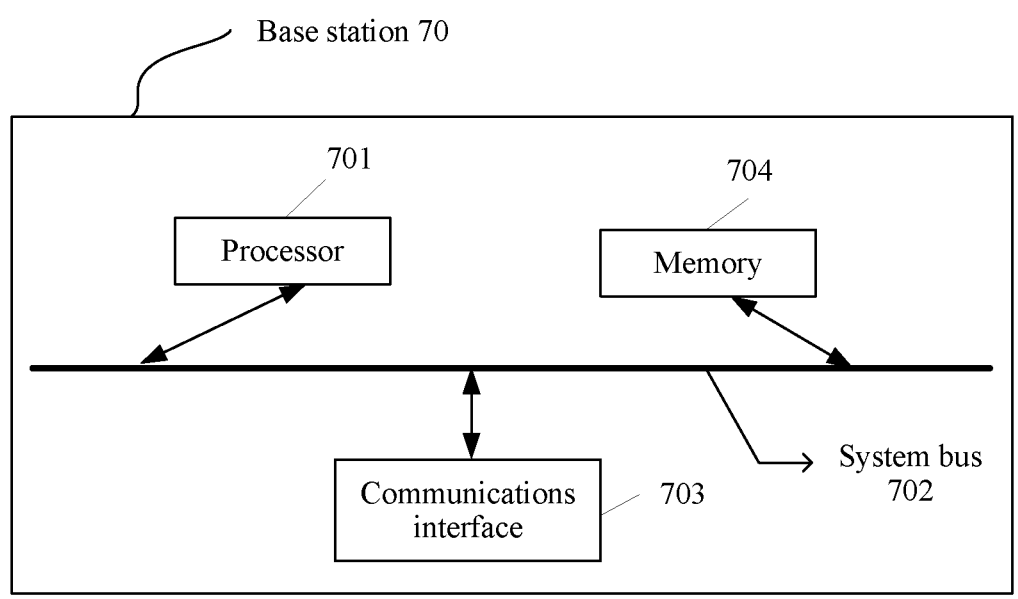
FIG. 9 is a schematic structural diagram of a base station according to yet an additional of the present disclosure.

This example of the present disclosure provides a base station 70. As shown in FIG. 9, the base station 70 may include a processor 701, a system bus 702, a communications interface 703, and a memory 704.

The processor 701 may be a central processing unit (English: central processing unit, CPU for short).

The memory 704 is configured to store program code, and transmit the program code to the processor 701. The processor 701 executes the following instructions according to the program code. The memory 704 may include a volatile memory (English: volatile memory), such as a random-access memory (RAM). The memory 704 may also include a nonvolatile memory (English: non-volatile memory), such as a read-only memory (ROM), a flash memory (English: flash memory), a hard disk drive (HDD), or a solid state drive (SSD). The memory 704 may further include a combination of the foregoing types of memories. The processor 701, the memory 704, and the communications interface 703 are connected and perform mutual communication by using the system bus 702.

The communications interface 703 may be implemented by an optical transceiver, an electrical transceiver, a wireless transceiver, or any combination thereof. For example, the optical transceiver may be a small form-factor pluggable (SFP) transceiver (English: transceiver), an enhanced small form-factor pluggable (SFP+) transceiver, or a 10-GB small form-factor pluggable (XFP) transceiver. The electrical transceiver may be an Ethernet (English: Ethernet) network interface controller (NIC). The wireless transceiver may be a wireless network interface controller (WNIC). The base station 70 may include a plurality of communications interfaces 703.

The processor 701 is configured to: transmit reserved power information of a first transmission time interval TTI and reserved power information of a second TTI to user equipment UE by using the communications interface 703, so that the UE allocates transmit power to L uplink channels according to the reserved power information of the first TTI and the reserved power information of the second TTI when a first time unit numbered i and a second time unit numbered j overlap in terms of time; or transmit reserved power information of a second TTI to the UE, so that the UE allocates transmit power to the L uplink channels according to the reserved power information of the second TTI when a first time unit numbered i and a second time unit numbered j overlap in terms of time.

For example, the first time unit may be a subframe having a length of 1 ms, a timeslot having a length of 0.5 ms, one or more SC-FDMA symbols, or one or more OFDMA symbols. The second time unit may be a timeslot having a length of 0.5 ms, one or more SC-FDMA symbols, one or more OFDMA symbols, or a time unit shorter than an SC-FDMA symbol or an OFDMA symbol. The first cell and a second cell may correspond to one or more base stations. For example, the first TTI may be 1 ms, and the second TTI may be 0.5 ms.

The processor 701 is configured to receive, by using the communications interface 703, the L uplink channels transmitted by the UE.

It should be noted that the L uplink channels include at least k second channels in the m second channels, 1≤k≤m, the second channel is an uplink channel corresponding to the second cell on the second time unit numbered j, duration of the first time unit is the first TTI, duration of the second time unit is the second TTI, and duration of the second TTI is shorter than duration of the first TTI.

The L uplink channels further include z first channels in n first channels, and the first channel is an uplink channel corresponding to a first cell on the first time unit numbered i.

The processor 701 is further configured to transmit capability indication information to the UE by using the communications interface 703, where the capability indication information is used to indicate that the UE transmits and/or receives both a channel corresponding to a long TTI and a channel corresponding to a short TTI.

Alternatively, the processor 701 is configured to receive, by using the communications interface 703, capability information reported by the UE, where the capability information is used to indicate that the UE supports transmitting and/or receiving both a channel corresponding to a long TTI and a channel corresponding to a short TTI.

The processor 701 is configured to transmit power control indication information to the UE by using the communications interface 703, where the power control indication information is used to indicate that the UE determines a first preset value, a second preset value, and a third preset value.

The base station provided in the present disclosure transmits the reserved power information of the first transmission time interval TTI and/or the reserved power information of the second TTI to the UE, so that the UE allocates the transmit power to the L uplink channels. The L uplink channels include at least the k second channels in the m second channels. Because a scenario in which the UE supports both the long TTI and the short TTI does not occur currently, it can be ensured that the UE allocates the transmit power to only the uplink channel corresponding to the long TTI. Once the UE supports both the long TTI and the short TTI, the transmit power cannot be allocated to the uplink channel corresponding to the short TTI. Consequently, no power is allocated to the uplink channel corresponding to the short TTI, and the uplink channel corresponding to the short TTI cannot be transmitted. According to the method, the UE, and the base station provided in the present disclosure, when the UE supports both the long TTI and the short TTI, it can be ensured that the transmit power is allocated to the uplink channel corresponding to the short TTI. Therefore, it can be ensured that the uplink channel corresponding to the short TTI is transmitted, so that a service carried on the uplink channel corresponding to the short TTI is properly received by the base station.

It should be understood that numbers i and j, and symbols m and n indicating a quantity, and the like in this example of the present disclosure are merely an example for description. In an actual process of implementing all examples of the present disclosure, a number may not be marked for the first channel, the second channel, or another object.

In an example, user equipment UE determines to transmit information by using a first channel set, and transmit information by using a second channel set. The first channel set includes at least one first channel, and the second channel set includes at least one second channel. Duration of a first channel in the first channel set is a first TTI, duration of a second channel in the second channel set is a second TTI, and the second TTI is shorter than the first TTI. At least one first channel and at least one second channel overlap. Information transmitted by using the first channel set and information transmitted by using the second channel set respectively correspond to different cells.

The UE determines a maximum transmission time difference between the first channel set and the second channel set, and the maximum transmission time difference is a maximum time difference between a start transmission time point of each first channel in the first channel set and a start transmission time point of each second channel in the second channel set.

The UE allocates transmit power to the L uplink channels according to the maximum transmission time difference, where the L uplink channels include at least k second channels in the second channel set. In an example, the at least one first channel and the at least one second channel overlap.

For the allocation process, the following examples are given specifically.

Example 1

When the maximum transmission time difference is greater than a first preset value, and start transmission time points of all first channels in the first channel set are earlier than start transmission time points of all second channels in the second channel set, the UE allocates a first power value to the k second channels in the second channel set according to a first channel priority; or when the maximum transmission time difference is greater than or equal to the first preset value, and start transmission time points of all first channels in the first channel set are earlier than start transmission time points of all second channels in the second channel set, the UE allocates a first power value to the k second channels in the second channel set according to a first channel priority.

In an example, the first power value is less than or equal to maximum transmit power of the UE. In another example, the UE allocates remaining power to at least one first channel in the first channel set according to the first channel priority, where the remaining power is a difference between the maximum transmit power of the UE and the first power value, and the L uplink channels further include at least one first channel selected from the first channel set.

In an example, the UE allocates remaining power to at least one first channel in the first channel set according to the first channel priority, where the remaining power is a difference between the maximum transmit power of the UE and the first power value. In an example, the L uplink channels further include at least one first channel selected from the first channel set.

Example 2

When the maximum uplink transmission time difference is greater than a first preset value, and start transmission time points of all first channels in the first channel set are earlier than start transmission time points of all second channels in the second channel set, the UE allocates a first power value to the k second channels in the second channel set according to a first channel priority, and allocates a second power value to z first channels in the first channel set according to the first channel priority; or when the maximum uplink transmission time difference is greater than or equal to the first preset value, and start transmission time points of all first channels in the first channel set are earlier than start transmission time points of all second channels in the second channel set, the UE allocates a first power value to the k second channels in the second channel set according to a first channel priority, and allocates a second power value to z first channels in the first channel set according to the first channel priority.

In an example, a sum of the first power value and the second power value is less than or equal to the maximum transmit power of the UE. In another example, the L uplink channels further include the z first channels in the first channel set.

In an example, the UE allocates remaining power to at least one second channel in the second channel set other than the k second channels according to the first channel priority. The remaining power is a difference between the maximum transmit power of the UE and a sum of the first power value and the second power value. The L uplink channels further include at least one second channel selected from the second channels other than the k second channels.

Example 3

When the maximum uplink transmission time difference is less than or equal to a second preset value, the UE first allocates maximum transmit power of the UE to the k second channels in the second channel set according to a second channel priority; or when the maximum uplink transmission time difference is greater than or equal to a third preset value, and start transmission time points of all second channels in the second channel set are earlier than start transmission time points of all first channels in the first channel set, the UE first allocates maximum transmit power of the UE to the k second channels in the second channel set according to a second channel priority.

Priority levels in descending order according to the second channel priority are as follows: the second channel and the first channel. In addition, power is allocated to the first channel according to a first channel priority, and power is allocated to the second channel according to the first channel priority.

Example 4

When the maximum uplink transmission time difference is less than or equal to a second preset value, the UE first allocates maximum transmit power of the UE to the k second channels in the second channel set and z first channels in the first channel set according to a third channel priority; or when the maximum uplink transmission time difference is greater than or equal to a third preset value, and start transmission time points of all second channels in the second channel set are earlier than start transmission time points of all first channels in the first channel set, the UE first allocates maximum transmit power of the UE to the k second channels in the m second channels and z first channels in the n first channels according to a third channel priority.

In this case, the L uplink channels further include the z first channels.

Examples of the present disclosure provide an uplink channel transmission method, UE, and a base station. When the UE supports both a long TTI and a short TTI, the UE can allocate transmit power to an uplink channel corresponding to the short TTI, so that the uplink channel corresponding to the short TTI can be transmitted, and a service carried on the uplink channel corresponding to the short TTI is properly received by the base station.

To achieve the foregoing objective, the following technical solutions are used in the examples of the present disclosure:

According to a first aspect, an uplink channel transmission method is provided, including:

determining, by UE, to transmit information by using first channels on n first time units numbered i, and transmit information by using second channels on m second time units numbered j, where a length of the first time unit numbered i is a first transmission time interval TTI, a length of the second time unit numbered j is a second TTI, the second TTI is shorter than the first TTI, at least one first time unit numbered i and at least one second time unit numbered j overlap, and information transmitted by using the first channel and information transmitted by using the second channel respectively correspond to different cells;

determining, by the UE, a maximum uplink transmission time difference between the n first time units numbered i and the m second time units numbered j, where the maximum uplink transmission time difference is a maximum difference between n start transmission time points of the n first time units numbered i and m start transmission time points of the m second time units numbered j;

allocating, by the UE, transmit power to L uplink channels according to the maximum uplink transmission time difference, where the L uplink channels include at least k second channels in the m second channels, and $1 \leq k \leq m$; and transmitting, by the UE, the L uplink channels.

With reference to the first aspect, in a first possible implementation of the first aspect, a first channel on the at least one first time unit numbered i and a second channel on the at least one second time unit numbered j overlap.

With reference to the first possible implementation of the first aspect, in a second possible implementation of the first aspect, the allocating, by the UE, transmit power to L uplink channels according to the maximum uplink transmission time difference specifically includes:

when the maximum uplink transmission time difference is greater than a first preset value, and a start transmission time point of the first time unit numbered i is earlier than a start transmission time point of the second time unit numbered j, allocating, by the UE, a first power value to the k second channels in the m second channels according to a first channel priority; or when the maximum uplink transmission time difference is greater than or equal to the first preset value, and a start transmission time point of the first time unit numbered i is earlier than a start transmission time point of the second time unit numbered j, allocating, by the UE, a first power value to the k second channels in the m second channels according to a first channel priority, where the first power value is less than or equal to maximum transmit power of the UE.

With reference to the second possible implementation of the first aspect, in a third possible implementation of the first aspect, the UE allocates remaining power to at least one of the n first channels according to the first channel priority, where the remaining power is a difference between the maximum transmit power of the UE and the first power value; and in this case, the L uplink channels further include at least one first channel selected from the n first channels.

With reference to the first possible implementation of the first aspect, in a fourth possible implementation of the first aspect, the allocating, by the UE, transmit power to L uplink channels according to the maximum uplink transmission time difference specifically includes:

when the maximum uplink transmission time difference is greater than a first preset value, and a start transmission time point of the first time unit numbered i is earlier than a start transmission time point of the second time unit numbered j, allocating a first power value to the k second channels in the m second channels according to a first channel priority, and allocating a second power value to z first channels in the n first channels according to the first channel priority; or when the maximum uplink transmission time difference is greater than or equal to the first preset value, and a start transmission time point of the first time unit numbered i is earlier than a start transmission time point of the second time unit numbered j, allocating, by the UE, a first power value to the k second channels in the m second channels according to a first channel priority, and allocating a second power value to z first channels in the n first channels according to the first channel priority, where a sum of the first power value and the second power value is less than or equal to maximum transmit power of the UE; and in this case, the L uplink channels further include the z first channels in the n first channels, where $1 \leq z \leq n$.

With reference to the fourth possible implementation of the first aspect, in a fifth possible implementation of the first aspect, the method further includes: allocating, by the UE, remaining power to at least one of (m−k) second channels in the m second channels other than the k second channels according to the first channel priority, where the remaining power is a difference between the maximum transmit power of the UE and the sum of the first power value and the second power value; and in this case, the L uplink channels further include at least one second channel selected from the (m−k) second channels in the m second channels other than the k second channels.

With reference to the first possible implementation of the first aspect, in a sixth possible implementation of the first aspect, the allocating, by the UE, transmit power to L uplink channels according to the maximum uplink transmission time difference specifically includes:

when the maximum uplink transmission time difference is less than or equal to a second preset value, first allocating, by the UE, maximum transmit power of the UE to the k second channels in the m second channels according to a second channel priority; or when the maximum uplink transmission time difference is greater than or equal to a third preset value, and a start transmission time point of the second time unit numbered j is earlier than a start transmission time point of the first time unit numbered i, first allocating, by the UE, maximum transmit power of the UE to the k second channels in the m second channels according to a second channel priority, where priority levels in descending order according to the second channel priority are as follows: the second channel and the first channel; power is allocated to the first channel according to a first channel priority, and power is allocated to the second channel according to the first channel priority.

With reference to the first possible implementation of the first aspect, in a seventh possible implementation of the first aspect, the allocating, by the UE, transmit power to L uplink channels according to the maximum uplink transmission time difference specifically includes:

when the maximum uplink transmission time difference is less than or equal to a second preset value, first allocating, by the UE, maximum transmit power of the UE to the k second channels in the m second channels and z first channels in the n first channels according to a third channel priority, where $1 \leq z \leq n$; or when the maximum uplink transmission time difference is greater than or equal to a third preset value, and a start transmission time point of the second time unit numbered j is earlier than a start transmission time point of the first time unit numbered i, first allocating, by the UE, maximum transmit power of the UE to the k second channels in the m second channels and z first channels in the n first channels according to a third channel priority; and in this case, the L uplink channels further include the z first channels.

With reference to any one of the second to the fifth possible implementations of the first aspect, in an eighth possible implementation of the first aspect, the first power value specifically includes:

a transmit power value used when the UE transmits an uplink channel corresponding to a second cell on a second time unit numbered (j−1); or a transmit power value used when the UE transmits a channel of a second cell last time; or a power value reserved by the UE for an uplink channel corresponding to the second TTI according to a predefined parameter; or a power value reserved by the UE for an uplink channel corresponding to the second TTI according to received reserved power information of the second TTI.

With reference to the fourth or the fifth possible implementation of the first aspect, in a ninth possible implementation of the first aspect, the second power value specifically includes:

a transmit power value used when the UE transmits an uplink channel corresponding to a first cell on a first time unit numbered (i−1); or a transmit power value used when the UE transmits a channel of a first cell last time; or a power value reserved by the UE for an uplink channel corresponding to the first TTI according to a predefined parameter; or a power value reserved by the UE for an uplink channel corresponding to the first TTI according to received reserved power information of the first TTI.

With reference to any one of the second to the sixth possible implementations of the first aspect, in a tenth possible implementation of the first aspect, priority levels in descending order according to the first channel priority are as follows:

a physical random access channel PRACH, a channel carrying a hybrid automatic repeat request-acknowledgment HARQ-ACK or a scheduling request SR, a channel carrying channel state information CSI, a channel carrying only data, and a sounding reference signal SRS; or priority levels in descending order according to the first channel priority are as follows: a physical random access channel PRACH, a physical uplink control channel PUCCH, a physical uplink shared channel PUSCH, and a sounding reference signal SRS.

With reference to the seventh possible implementation of the first aspect, in an eleventh possible implementation of the first aspect, priority levels in descending order according to the third channel priority are as follows:

a PRACH in the first channels, a second channel other than a sounding reference signal SRS in the second channels, a first channel carrying an HARQ-ACK or SR in the first channels, a first channel carrying CSI in the first channels, a first channel carrying only data, the SRS in the second channels, and an SRS in the first channels; or a PRACH in the first channels, a second channel other than an SRS in the second channels and a second channel carrying only data, a first channel carrying an HARQ-ACK or SR, the second channel carrying only data, a first channel carrying only data, the SRS in the second channels, and an SRS in the first channels.

With reference to any one of the first to the eleventh possible implementations of the first aspect, in a twelfth possible implementation of the first aspect, before the UE determines the n first channels and the m second channels, the method further includes:

reporting, by the UE, capability information, where the capability information is used to indicate that the UE can support transmitting and/or receiving both a channel corresponding to a long TTI and a channel corresponding to a short TTI; or receiving, by the UE, capability indication information, where the capability indication information is used to indicate that the UE transmits and/or receives both a channel corresponding to a long TTI and a channel corresponding to a short TTI.

With reference to any one of the first to the twelfth possible implementations of the first aspect, in a thirteenth possible implementation of the first aspect, the first preset value, the second preset value, and the third preset value are parameters pre-stored by the UE; or the first preset value, the second preset value, and the third preset value are determined by the UE according to received power control indication information.

According to a second aspect, an uplink channel transmission method is provided, including:

transmitting, by a base station, reserved power information of a first transmission time interval TTI and reserved power information of a second TTI to user equipment UE, so that the UE allocates transmit power to L uplink channels according to the reserved power information of the first TTI and the reserved power information of the second TTI when a first time unit numbered i and a second time unit numbered j overlap; or transmitting reserved power information of a second TTI to UE, so that the UE allocates transmit power to a L uplink channels according to the reserved power information of the second TTI when a first time unit numbered i and a second time unit numbered j overlap; and receiving, by the base station, the L uplink channels transmitted by the UE, where the L uplink channels include at least k second channels in m second channels, $1 \leq k \leq m$, the second channel is an uplink channel on the second time unit numbered j, duration of the first time unit is the first TTI, duration of the second time unit is the second TTI, and duration of the second TTI is shorter than duration of the first TTI.

With reference to the second aspect, in a first possible implementation of the second aspect, a first channel on at least one first time unit numbered i and a second channel on at least one second time unit numbered j overlap.

With reference to the second aspect, in a second possible implementation of the second aspect, the L uplink channels further include z first channels in n first channels, the first channel is an uplink channel on the first time unit numbered i, and information transmitted by using the first channel and information transmitted by using the second channel respectively correspond to different cells.

With reference to any one of the second aspect or the first and the second possible implementations of the second aspect, in a third possible implementation of the second aspect, the method further includes:

transmitting, by the base station, capability indication information to the UE, where the capability indication information is used to indicate that the UE transmits and/or receives both a channel corresponding to a long TTI and a channel corresponding to a short TTI; or receiving capability information reported by the UE, where the capability information is used to indicate that the UE supports transmitting and/or receiving both a channel corresponding to a long TTI and a channel corresponding to a short TTI.

With reference to any one of the second aspect or the first and the second possible implementations of the second aspect, in a fourth possible implementation of the second aspect, the method further includes:

transmitting, by the base station, power control indication information to the UE, where the power control indication information is used to indicate that the UE determines a first preset value, a second preset value, and a third preset value.

According to a third aspect, UE is provided, including:

a determining unit, configured to determine to transmit information by using first channels on n first time units numbered i, and transmit information by using second channels on m second time units numbered j, where a length of the first time unit numbered i is a first transmission time interval TTI, a length of the second time unit numbered j is a second TTI, the second TTI is shorter than the first TTI, at least one first time unit numbered i and at least one second time unit numbered j overlap, and information transmitted by using the first channel and information transmitted by using the second channel respectively correspond to different cells, where the determining unit is further configured to determine a maximum uplink transmission time difference between the n first time units numbered i and the m second time units numbered j, where the maximum uplink transmission time difference is a maximum difference between n start transmission time points of the n first time units numbered i and m start transmission time points of the m second time units numbered j;

a power allocation unit, configured to allocate transmit power to L uplink channels according to the maximum uplink transmission time difference, where the L uplink channels include at least k second channels in the m second channels, and $1 \leq k \leq m$; and a transmission unit, configured to transmit the L uplink channels.

With reference to the third aspect, in a first possible implementation of the third aspect, a first channel on the at least one first time unit numbered i and a second channel on the at least one second time unit numbered j overlap.

With reference to the first possible implementation of the third aspect, in a second possible implementation of the third aspect, the power allocation unit is specifically configured to: when the maximum uplink transmission time difference is greater than a first preset value, and a start transmission time point of the first time unit numbered i is earlier than a start transmission time point of the second time unit numbered j, allocate a first power value to the k second channels in the m second channels according to a first channel priority; or when the maximum uplink transmission time difference is greater than or equal to the first preset value, and a start transmission time point of the first time unit numbered i is earlier than a start transmission time point of the second time unit numbered j, allocate a first power value to the k second channels in the m second channels according to a first channel priority, where the first power value is less than or equal to maximum transmit power of the UE.

With reference to the second possible implementation of the third aspect, in a third possible implementation of the third aspect, the power allocation unit is further configured to allocate remaining power to at least one of the n first channels according to the first channel priority, where the remaining power is a difference between the maximum transmit power of the UE and the first power value; and in this case, the L uplink channels further include at least one first channel selected from the n first channels.

With reference to the first possible implementation of the third aspect, in a fourth possible implementation of the third aspect, the power allocation unit is specifically configured to: when the maximum uplink transmission time difference is greater than a first preset value, and a start transmission time point of the first time unit numbered i is earlier than a start transmission time point of the second time unit numbered j, allocate a first power value to the k second channels in the m second channels according to a first channel priority, and allocate a second power value to z first channels in the n first channels according to the first channel priority; or when the maximum uplink transmission time difference is greater than or equal to the first preset value, and a start transmission time point of the first time unit numbered i is earlier than a start transmission time point of the second time unit numbered j, allocate a first power value to the k second channels in the m second channels according to a first channel priority, and allocate a second power value to z first channels in the n first channels according to the first channel priority, where a sum of the first power value and the second power value is less than or equal to maximum transmit power of the UE; and in this case, the L uplink channels further include the z first channels in the n first channels, where $1 \leq z \leq n$.

With reference to the fourth possible implementation of the third aspect, in a fifth possible implementation of the third aspect, the power allocation unit is further configured to allocate remaining power to at least one of (m−k) second channels in the m second channels other than the k second channels according to the first channel priority, where the remaining power is a difference between the maximum transmit power of the UE and the sum of the first power value and the second power value; and in this case, the L uplink channels further include at least one second channel selected from the (m−k) second channels in the m second channels other than the k second channels.

With reference to the first possible implementation of the third aspect, in a sixth possible implementation of the third aspect, the power allocation unit is specifically configured to: when the maximum uplink transmission time difference is less than or equal to a second preset value, first allocate maximum transmit power of the UE to the k second channels in the m second channels according to a second channel priority; or when the maximum uplink transmission time difference is greater than or equal to a third preset value, and a start transmission time point of the second time unit numbered j is earlier than a start transmission time point of the first time unit numbered i, first allocate maximum transmit power of the UE to the k second channels in the m second channels according to a second channel priority, where priority levels in descending order according to the second channel priority are as follows: the second channel and the first channel; power is allocated to the first channel according to a first channel priority, and power is allocated to the second channel according to the first channel priority.

With reference to the first possible implementation of the third aspect, in a seventh possible implementation of the third aspect, the power allocation unit is specifically configured to: when the maximum uplink transmission time difference is less than or equal to a second preset value, first allocate maximum transmit power of the UE to the k second channels in the m second channels and z first channels in the n first channels according to a third channel priority; or when the maximum uplink transmission time difference is greater than or equal to a third preset value, and a start transmission time point of the second time unit numbered j is earlier than a start transmission time point of the first time unit numbered i, first allocate maximum transmit power of the UE to the k second channels in the m second channels and z first channels in the n first channels according to a third channel priority, where $1 \leq z \leq n$; and in this case, the L uplink channels further include the z first channels.

With reference to any one of the second to the fifth possible implementations of the third aspect, in an eighth possible implementation of the third aspect, the first power value specifically includes:

a transmit power value used when the UE transmits an uplink channel corresponding to a second cell on a second time unit numbered (j−1); or a transmit power value used when the UE transmits a channel of a second cell last time; or a power value reserved by the UE for an uplink channel corresponding to the second TTI according to a predefined parameter; or a power value reserved by the UE for an uplink channel corresponding to the second TTI according to received reserved power information of the second TTI.

With reference to the fourth or the fifth possible implementation of the third aspect, in a ninth possible implementation of the third aspect, the second power value specifically includes:

a transmit power value used when the UE transmits an uplink channel corresponding to a first cell on a first time unit numbered (i−1); or a transmit power value used when the UE transmits a channel of a first cell last time; or a power value reserved by the UE for an uplink channel corresponding to the first TTI according to a predefined parameter; or a power value reserved by the UE for an uplink channel corresponding to the first TTI according to received reserved power information of the first TTI.

With reference to any one of the second to the sixth possible implementations of the third aspect, in a tenth possible implementation of the third aspect, priority levels in descending order according to the first channel priority are as follows:

a physical random access channel PRACH, a channel carrying a hybrid automatic repeat request-acknowledgment HARQ-ACK or a scheduling request SR, a channel carrying channel state information CSI, a channel carrying only data, and a sounding reference signal SRS; or priority levels in descending order according to the first channel priority are as follows: a physical random access channel PRACH, a physical uplink control channel PUCCH, a physical uplink shared channel PUSCH, and a sounding reference signal SRS.

With reference to the seventh possible implementation of the third aspect, in an eleventh possible implementation of the third aspect, priority levels in descending order according to the third channel priority are as follows:

a PRACH in the first channels, a second channel other than a sounding reference signal SRS in the second channels, a first channel carrying an HARQ-ACK or SR in the first channels, a first channel carrying CSI in the first channels, a first channel carrying only data, the SRS in the second channels, and an SRS in the first channels; or a PRACH in the first channels, a second channel other than an SRS in the second channels and a second channel carrying only data, a first channel carrying an HARQ-ACK or SR, the second channel carrying only data, a first channel carrying only data, the SRS in the second channels, and an SRS in the first channels.

With reference to any one of the first to the eleventh possible implementations of the third aspect, in a twelfth possible implementation of the third aspect, the transmission unit is further configured to report capability information, where the capability information is used to indicate that the UE can support transmitting and/or receiving both a channel corresponding to a long TTI and a channel corresponding to a short TTI; or or the UE further includes a receiving unit, and the receiving unit is configured to receive capability indication information, where the capability indication information is used to indicate that the UE transmits and/or receives both a channel corresponding to a long TTI and a channel corresponding to a short TTI.

With reference to any one of the first to the twelfth possible implementations of the third aspect, in a thirteenth possible implementation of the third aspect, the first preset value, the second preset value, and the third preset value are parameters pre-stored by the UE; or the first preset value, the second preset value, and the third preset value are determined by the UE according to received power control indication information.

According to a fourth aspect, a base station is provided, including:

a transmission unit, configured to: transmit reserved power information of a first transmission time interval TTI and reserved power information of a second TTI to user equipment UE, so that the UE allocates transmit power to L uplink channels according to the reserved power information of the first TTI and the reserved power information of the second TTI when a first time unit numbered i and a second time unit numbered j overlap in terms of time; or transmit reserved power information of a second TTI to UE, so that the UE allocates transmit power to a L uplink channels according to the reserved power information of the second TTI when a first time unit numbered i and a second time unit numbered j overlap in terms of time; and a receiving unit, configured to receive the L uplink channels transmitted by the UE, where the L uplink channels include at least k second channels in m second channels, $1 \leq k \leq m$, the second channel is an uplink channel on the second time unit numbered j, duration of the first time unit is the first TTI, duration of the second time unit is the second TTI, and duration of the second TTI is shorter than duration of the first TTI.

With reference to the fourth aspect, in a first possible implementation of the fourth aspect, a first channel on at least one first time unit numbered i and a second channel on at least one second time unit numbered j overlap.

With reference to the first possible implementation of the fourth aspect, in a second possible implementation of the fourth aspect, the L uplink channels further include z first channels in n first channels, and the first channel is an uplink channel corresponding to a first cell on the first time unit numbered i.

With reference to any one of the fourth aspect or the first and the second possible implementations of the fourth aspect, in a third possible implementation of the fourth aspect, the transmission unit is further configured to transmit capability indication information to the UE, where the capability indication information is used to indicate that the UE transmits and/or receives both a channel corresponding to a long TTI and a channel corresponding to a short TTI; or the receiving unit is further configured to receive capability information reported by the UE, where the capability information is used to indicate that the UE supports transmitting and/or receiving both a channel corresponding to a long TTI and a channel corresponding to a short TTI.

With reference to any one of the fourth aspect or the first and the second possible implementations of the fourth aspect, in a fourth possible implementation of the fourth aspect, the transmission unit is further configured to transmit power control indication information to the UE, where the power control indication information is used to indicate that the UE determines a first preset value, a second preset value, and a third preset value.

The present disclosure provides the uplink channel transmission method, the UE, and the base station. The UE determines the n first channels (uplink channels corresponding to the long TTI) and the m second channels (uplink channels corresponding to the short TTI), and allocates the transmit power to the L uplink channels according to the maximum uplink transmission time difference between the n first channels and the m second channels. The L uplink channels include at least the k second channels in the m second channels, $1 \leq k \leq m$, and the first TTI corresponding to the first channel is shorter than the second TTI corresponding to the second channel. The UE transmits the L uplink channels. Because a scenario in which the UE supports both the long TTI and the short TTI does not occur currently, it can be ensured that the UE allocates the transmit power to only the uplink channel corresponding to the long TTI. Once the UE supports both the long TTI and the short TTI, the transmit power cannot be allocated to the uplink channel corresponding to the short TTI. Consequently, no power is allocated to the uplink channel corresponding to the short TTI, and the uplink channel corresponding to the short TTI cannot be transmitted. According to the method, the UE, and the base station provided in the present disclosure, when the UE supports both the long TTI and the short TTI, it can be ensured that the transmit power is allocated to the uplink channel corresponding to the short TTI. Therefore, it can be ensured that the uplink channel corresponding to the short TTI is transmitted, so that a service carried on the uplink channel corresponding to the short TTI is properly received by the base station.

The foregoing four examples specifically list a power allocation method of the UE. It should be understood that for specific content such as the first power value, the second power value, the first channel priority, and the third channel priority, refer to another example of the present disclosure, and details are not described herein again.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. An uplink channel transmission method, comprising:
    determining, by a user equipment (UE), to transmit information by using first channels on n first time units numbered i, and transmit information by using second channels on m second time units numbered j, wherein the first time unit numbered i is a first transmission time interval (TTI), the second time unit numbered j is a second TTI, the second TTI is shorter than the first TTI, at least one first time unit numbered i and at least one second time unit numbered j overlap, and the information transmitted by using the first channel and the information transmitted by using the second channel correspond to different cells;
    determining, by the UE, a maximum uplink transmission time difference between the n first time units numbered i and the m second time units numbered j, wherein the maximum uplink transmission time difference is a maximum difference between n start transmission time points of the n first time units numbered i and m start transmission time points of the m second time units numbered j;
    allocating, by the UE, transmit power to L uplink channels according to the maximum uplink transmission time difference, wherein the L uplink channels comprise at least k second channels among the m second channels, wherein k is a positive integer and 1≤k≤m; and
    transmitting, by the UE, the L uplink channels.

2. The method according to claim 1, wherein a first channel on the at least one first time unit numbered i and a second channel on the at least one second time unit numbered j overlap.

3. The method according to claim 2, wherein allocating, by the UE, the transmit power to the L uplink channels according to the maximum uplink transmission time difference comprises:
    when the maximum uplink transmission time difference is greater than a first preset value, and a start transmission time point of the first time unit numbered i is earlier than a start transmission time point of the second time unit numbered j, allocating, by the UE, a first power value to the k second channels among the m second channels according to a first channel priority; or
    when the maximum uplink transmission time difference is greater than or equal to the first preset value, and the start transmission time point of the first time unit numbered i is earlier than the start transmission time point of the second time unit numbered j, allocating, by the UE, the first power value to the k second channels among the m second channels according to the first channel priority, wherein the first power value is less than or equal to maximum transmit power of the UE.

4. The method according to claim 2, wherein allocating, by the UE, the transmit power to the L uplink channels according to the maximum uplink transmission time difference comprises:
    when the maximum uplink transmission time difference is greater than a first preset value, and a start transmission time point of the first time unit numbered i is earlier than a start transmission time point of the second time unit numbered j, allocating a first power value to the k second channels among the m second channels according to a first channel priority, and allocating a second power value to z first channels among the n first channels according to the first channel priority; or
    when the maximum uplink transmission time difference is greater than or equal to the first preset value, and the start transmission time point of the first time unit numbered i is earlier than the start transmission time point of the second time unit numbered j, allocating, by the UE, the first power value to the k second channels among the m second channels according to the first channel priority, and allocating the second power value to the z first channels among the n first channels according to the first channel priority, wherein a sum of the first power value and the second power value is less than or equal to maximum transmit power of the UE; and
    wherein the L channels comprise the z first channels among the n first channels, and wherein z is a positive integer and 1≤z≤n.

5. The method according to claim 2, wherein allocating, by the UE, the transmit power to the L uplink channels according to the maximum uplink transmission time difference comprises:
    when the maximum uplink transmission time difference is less than or equal to a second preset value, first allocating, by the UE, maximum transmit power of the UE to the k second channels among the m second channels according to a second channel priority; or
    when the maximum uplink transmission time difference is greater than or equal to a third preset value, and a start transmission time point of the second time unit numbered j is earlier than a start transmission time point of the first time unit numbered i, first allocating, by the UE, the maximum transmit power of the UE to the k second channels among the m second channels according to the second channel priority, wherein:
priority levels in descending order according to the second channel priority are: the second channel and the first channel, wherein power is allocated to the first channel according to a first channel priority, and power is allocated to the second channel according to the first channel priority.

6. The method according to claim 2, wherein allocating, by the UE, the transmit power to the L uplink channels according to the maximum uplink transmission time difference comprises:
when the maximum uplink transmission time difference is less than or equal to a second preset value, first allocating, by the UE, maximum transmit power of the UE to the k second channels among the m second channels and z first channels among the n first channels according to a third channel priority, wherein z is a positive integer and 1≤z≤n; or
when the maximum uplink transmission time difference is greater than or equal to a third preset value, and a start transmission time point of the second time unit numbered j is earlier than a start transmission time point of the first time unit numbered i, first allocating, by the UE, the maximum transmit power of the UE to the k second channels among the m second channels and the z first channels among the n first channels according to the third channel priority; and
wherein the L uplink channels further comprise the z first channels.

7. The method according to claim 3, wherein the first power value comprises:
a transmit power value used when the UE transmits an uplink channel corresponding to a second cell on a second time unit wherein the second time unit is numbered (j−1); or
the transmit power value used when the UE transmits a channel of a second cell last time; or
a power value reserved by the UE for an uplink channel corresponding to the second TTI according to a predefined parameter; or
the power value reserved by the UE for an uplink channel corresponding to the second TTI according to received reserved power information of the second TTI.

8. The method according to claim 6, wherein priority levels in descending order according to the third channel priority are:
a Physical Random Access Channel (PRACH) in the first channel, a second channel other than a Sounding Reference Signal (SRS) in the second channel, a first channel carrying an Hybrid Automatic Repeat request-Acknowledgement (HARQ-ACK) or a Scheduling Request (SR) in the first channel, a first channel carrying Channel State Information (CSI) in the first channel, a first channel carrying only data, the SRS in the second channel, and an SRS in the first channel; or
the PRACH in the first channel, the second channel other than the SRS in the second channel and a second channel carrying only data, the first channel carrying the HARQ-ACK or the SR, the second channel carrying only data, the first channel carrying only data, the SRS in the second channel, and the SRS in the first channel.

9. The method according to claim 2, wherein before the UE determines the n first channels and the m second channels, the method further comprises:
reporting, by the UE, capability information, wherein the capability information is used to indicate that the UE can support transmitting and/or receiving both a channel corresponding to a long TTI and a channel corresponding to a short TTI; or
receiving, by the UE, capability indication information, wherein the capability indication information is used to indicate that the UE transmits and/or receives both the channel corresponding to the long TTI and the channel corresponding to the short TTI.

10. A user equipment (UE), comprising:
a determining circuit, configured to determine to transmit information by using first channels on n first time units numbered i, and transmit information by using second channels on m second time units numbered j, wherein the first time unit numbered i is a first transmission time interval (TTI), the second time unit numbered j is a second TTI, the second TTI is shorter than the first TTI, at least one first time unit numbered i and at least one second time unit numbered j overlap, and the information transmitted by using the first channel and the information transmitted by using the second channel correspond to different cells, and wherein the determining circuit is further configured to determine a maximum uplink transmission time difference between the n first time units numbered i and the m second time units numbered j, wherein the maximum uplink transmission time difference is a maximum difference between n start transmission time points of the n first time units numbered i and m start transmission time points of the m second time units numbered j;
a power allocation circuit, configured to allocate transmit power to L uplink channels according to the maximum uplink transmission time difference, wherein the L uplink channels comprise at least k second channels among the m second channels, and wherein k is a positive integer and 1≤k≤m; and
a transmission circuit, configured to transmit the L uplink channels.

11. The UE according to claim 10, wherein a first channel on the at least one first time unit numbered i and a second channel on the at least one second time unit numbered j overlap.

12. The UE according to claim 11, wherein the power allocation circuit is configured to: when the maximum uplink transmission time difference is greater than a first preset value, and a start transmission time point of the first time unit numbered i is earlier than a start transmission time point of the second time unit numbered j, allocate a first power value to the k second channels among the m second channels according to a first channel priority; or
when the maximum uplink transmission time difference is greater than or equal to the first preset value, and the start transmission time point of the first time unit numbered i is earlier than the start transmission time point of the second time unit numbered j, allocate the first power value to the k second channels in the m second channels according to a first channel priority, wherein the first power value is less than or equal to maximum transmit power of the UE.

13. The UE according to claim 11, wherein the power allocation circuit is configured to: when the maximum uplink transmission time difference is greater than a first preset value, and a start transmission time point of the first time unit numbered i is earlier than a start transmission time point of the second time unit numbered j, allocate a first power value to the k second channels among the m second channels according to a first channel priority, and allocate a second power value to z first channels among the n first channels according to the first channel priority; or when the maximum uplink transmission time difference is greater than or equal to the first preset value, and the start transmission time point of the first time unit numbered i is earlier than the start transmission time point of the second time unit numbered j, allocate a first power value to the k second channels among the m second channels according to the first channel priority, and allocate the second power value to the z first channels among the n first channels according to the first channel priority, wherein a sum of the first power value and the second power value is less than or equal to maximum transmit power of the UE; and wherein the L uplink channels comprise the z first channels among the n first channels, and wherein z is a positive integer and $1 \leq z \leq n$.

14. The UE according to claim 11, wherein the power allocation circuit is configured to: when the maximum uplink transmission time difference is less than or equal to a second preset value, first allocate maximum transmit power of the UE to the k second channels among the m second channels according to a second channel priority; or when the maximum uplink transmission time difference is greater than or equal to a third preset value, and a start transmission time point of the second time unit numbered j is earlier than a start transmission time point of the first time unit numbered i, first allocate the maximum transmit power of the UE to the k second channels among the m second channels according to the second channel priority, wherein:

priority levels in descending order according to the second channel priority are: the second channel and the first channel, wherein power is allocated to the first channel according to a first channel priority, and power is allocated to the second channel according to the first channel priority.

15. The UE according to claim 11, wherein the power allocation circuit is configured to: when the maximum uplink transmission time difference is less than or equal to a second preset value, first allocate maximum transmit power of the UE to the k second channels among the m second channels and z first channels among the n first channels according to a third channel priority; or when the maximum uplink transmission time difference is greater than or equal to a third preset value, and a start transmission time point of the second time unit numbered j is earlier than a start transmission time point of the first time unit numbered i, first allocate the maximum transmit power of the UE to the k second channels among the m second channels and the z first channels among the n first channels according to the third channel priority, wherein z is a positive integer and $1 \leq z \leq n$; and wherein the L uplink channels further comprise the z first channels.

16. The UE according to claim 12, wherein the first power value comprises:

a transmit power value used when the UE transmits an uplink channel corresponding to a second cell on a second time unit wherein the second time unit is numbered (j−1); or the transmit power value used when the UE transmits a channel of a second cell last time; or a power value reserved by the UE for an uplink channel corresponding to the second TTI according to a predefined parameter; or the power value reserved by the UE for an uplink channel corresponding to the second TTI according to received reserved power information of the second TTI.

17. The UE according to claim 13, wherein the second power value comprises:

a transmit power value used when the UE transmits an uplink channel corresponding to a first cell on a first time unit wherein the first time unit is numbered (i−1); or the transmit power value used when the UE transmits a channel of a first cell last time; or a power value reserved by the UE for an uplink channel corresponding to the first TTI according to a predefined parameter; or the power value reserved by the UE for an uplink channel corresponding to the first TTI according to received reserved power information of the first TTI.

18. The UE according to claim 15, wherein priority levels in descending order according to the third channel priority are:

a PRACH in the first channel, a second channel other than a sounding reference signal SRS in the second channel, a first channel carrying an HARQ-ACK or a SR in the first channel, a first channel carrying CSI in the first channel, a first channel carrying only data, the SRS in the second channel, and an SRS in the first channel; or the PRACH in the first channel, the second channel other than the SRS in the second channel and a second channel carrying only data, the first channel carrying the HARQ-ACK or the SR, the second channel carrying only data, the first channel carrying only data, the SRS in the second channel, and the SRS in the first channel.

* * * * *

UNITED STATES PATENT AND TRADEMARK OFFICE
CERTIFICATE OF CORRECTION

PATENT NO. : 10,531,481 B2
APPLICATION NO. : 15/899287
DATED : January 7, 2020
INVENTOR(S) : Jiafeng Shao It is certified that error appears in the above-identified patent and that said Letters Patent is hereby corrected as shown below:

In the Claims

Claim 1, Column 41, Line 59: "points of then first time units numbered i and m start" should read -- points of the n first time units numbered i and m start --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*